(12) United States Patent
Hess et al.

(10) Patent No.: US 11,892,026 B2
(45) Date of Patent: Feb. 6, 2024

(54) FASTENER LOCK MECHANISMS WITH LOCK ARMS

(71) Applicant: Enduralock, LLC, Lenexa, KS (US)

(72) Inventors: Harold Hess, Leawood, KS (US); Deeptesh Selvaraj, Pitt Meadows (CA)

(73) Assignee: Enduralock, LLC, Lenexa, KS (US)

( * ) Notice: Subject to any disclaimer, the term of this patent is extended or adjusted under 35 U.S.C. 154(b) by 455 days.

(21) Appl. No.: 17/118,269

(22) Filed: Dec. 10, 2020

(65) Prior Publication Data
US 2021/0172469 A1 Jun. 10, 2021

Related U.S. Application Data

(60) Provisional application No. 62/946,141, filed on Dec. 10, 2019.

(51) Int. Cl.
*F16B 39/282* (2006.01)
*F16B 39/24* (2006.01)

(52) U.S. Cl.
CPC ............ *F16B 39/282* (2013.01); *F16B 39/24* (2013.01)

(58) Field of Classification Search
CPC ........ F16B 39/24; F16B 39/26; F16B 39/282; F16B 39/02; F16B 39/32; F16B 39/10; F16B 39/108; F16B 41/002; B62D 1/184; Y10S 411/926; Y10S 411/957; Y10S 411/961; Y10S 411/978; Y10T 403/1691
USPC .................................................. 411/119, 120
See application file for complete search history.

(56) References Cited

U.S. PATENT DOCUMENTS

| | | | |
|---|---|---|---|
| 588,346 A | 8/1897 | Mireault | |
| 677,212 A | 6/1901 | Hellman | |
| 687,774 A | 12/1901 | Oliver | |
| 969,397 A * | 9/1910 | Partridge | F16B 39/10 411/128 |
| 1,051,770 A * | 1/1913 | Slattery | F16B 39/10 411/128 |
| 1,181,494 A | 5/1916 | Warren et al. | |
| 1,317,567 A | 9/1919 | Fewster | |
| 1,646,805 A | 10/1927 | Bell | |
| 1,651,187 A | 11/1927 | Cole | |
| 1,916,526 A | 7/1933 | Olson | |

(Continued)

FOREIGN PATENT DOCUMENTS

| | | |
|---|---|---|
| EP | 3283778 B1 | 1/2020 |
| JP | 2006307965 A | 11/2006 |

*Primary Examiner* — Victor D Batson
*Assistant Examiner* — Carl J Carlson
(74) *Attorney, Agent, or Firm* — Armstrong Teasdale LLP

(57) ABSTRACT

A fastener assembly includes a threaded member and a first lock member coupled to the threaded member. The first lock member includes a plurality of ratchet teeth. The fastener assembly further includes a second lock member including at least one lock tooth configured to engage the plurality of ratchet teeth of the first lock member. The fastener assembly has a locked configuration in which the at least one lock tooth engages the plurality of ratchet teeth and an unlocked configuration in which the at least one lock tooth is spaced from the plurality of ratchet teeth. The fastener assembly also includes at least one lock arm coupled to the second lock member. The at least one lock arm extends at least in part radially outward of the second lock member. The at least one lock arm is configured to engage a surface to inhibit rotation of the second lock member.

20 Claims, 24 Drawing Sheets

(56) References Cited

U.S. PATENT DOCUMENTS

| | | | |
|---|---|---|---|
| 3,275,055 A | 9/1966 | Gutshall | |
| 3,804,140 A * | 4/1974 | Harper | F16B 39/24 |
| | | | 411/116 |
| 5,533,849 A | 7/1996 | Burdick | |
| 5,606,753 A | 3/1997 | Hashimoto | |
| 5,618,143 A | 7/1997 | Cronin, II et al. | |
| 5,897,277 A | 4/1999 | Barre et al. | |
| 9,435,370 B2 | 9/2016 | Hughes | |
| 9,657,766 B2 | 5/2017 | Hess | |
| 9,719,550 B2 | 8/2017 | Stewart | |
| 2004/0036292 A1 | 2/2004 | Austin | |
| 2014/0026382 A1 | 1/2014 | Smith et al. | |
| 2014/0119849 A1 | 5/2014 | Seaman et al. | |
| 2014/0356097 A1 | 12/2014 | Hess et al. | |
| 2016/0084291 A1 | 3/2016 | Steward | |
| 2016/0305465 A1 | 10/2016 | Hess et al. | |

* cited by examiner

FASTENER LOCK MECHANISMS WITH LOCK ARMS

CROSS REFERENCE TO RELATED APPLICATION

This application claims priority to U.S. Provisional Patent Application Ser. No. 62/946,141, filed Dec. 10, 2019, which is incorporated herein by reference in its entirety.

BACKGROUND

The field of the disclosure relates generally to fasteners, and more specifically to lock mechanisms for fasteners.

Fasteners commonly include mechanisms or design features for ensuring that fastener elements do not loosen over time, potentially allowing joined elements to loosen or separate. Examples of mechanisms include thread bore inserts and screw thread profiles that deform when tightened. Fasteners accessories like lock members, cotter pins, and lock wires are also commonly used with fasteners to prevent fastener elements from loosening. Adhesive materials, like epoxy, can be applied to fastener threads to stake fastener elements and prevent fastener elements from loosening. However, conventional fastener mechanisms, accessories, and adhesive materials may not be suitable for some applications, such as high temperature environments or with structures subject to extreme vibration.

In addition, some elements, such as header assemblies for manifolds, include openings that are only accessible from a single side, i.e., blind openings. Fastener assemblies for such elements cannot rely on nuts or other lock mechanisms on an opposite side of the opening to provide a secure connection. Also, elements with blind openings have different shapes, sizes, and configurations and at least some fastener assemblies do not accommodate the shapes, sizes, or configurations of the elements. Accordingly, at least some elements with blind openings require specialized fastener assemblies which can be expensive and difficult to assemble.

Accordingly, there is a need for improved lock mechanisms for fasteners.

BRIEF DESCRIPTION

In one aspect, a fastener assembly is provided. The fastener assembly includes a threaded member including a threaded body portion having a longitudinal axis. The fastener assembly also includes a first lock member coupled to the threaded member. The first lock member includes a plurality of ratchet teeth. The fastener assembly further includes a second lock member including at least one lock tooth configured to engage the plurality of ratchet teeth of the first lock member. The fastener assembly has a locked configuration in which the at least one lock tooth engages the plurality of ratchet teeth and an unlocked configuration in which the at least one lock tooth is spaced from the plurality of ratchet teeth. The fastener assembly also includes at least one lock arm coupled to the second lock member. The at least one lock arm extends at least in part radially outward of the second lock member. The at least one lock arm is configured to engage a surface to inhibit rotation of the second lock member.

In another aspect, a lock assembly for a threaded member is provided. The lock assembly includes a first lock member including an inner portion and a plurality of ratchet teeth extending from the inner portion. The inner portion defines an aperture to receive the threaded member. The lock assembly also includes a second lock member including at least one lock tooth configured to engage the plurality of ratchet teeth of the first lock member. The lock assembly has a locked configuration in which the at least one lock tooth engages the plurality of ratchet teeth and an unlocked configuration in which the at least one lock tooth is spaced from the plurality of ratchet teeth. The lock assembly further includes at least one lock arm coupled to the second lock member and extending at least in part radially outward of the second lock member. The at least one lock arm is configured to engage a surface to inhibit rotation of the second lock member.

In yet another aspect, a method of assembling a lock assembly for a fastener assembly is provided. The fastener assembly includes a threaded member. The method includes forming a first lock member including an inner portion and a plurality of ratchet teeth extending from the inner portion. The inner portion defines an aperture to receive the threaded member. The method also includes forming a second lock member including an inner portion and at least one tab extending from the inner portion, and forming at least one lock tooth on the at least one tab. The at least one lock tooth is configured to engage the plurality of ratchet teeth of the first lock member. The lock assembly has a locked configuration in which the at least one lock tooth engages the plurality of ratchet teeth and an unlocked configuration in which the at least one lock tooth is spaced from the plurality of ratchet teeth. The method further includes forming at least one lock arm configured to couple to the second lock member and extend at least in part radially outward of the second lock member. The at least one lock arm is configured to engage a surface to inhibit rotation of the second lock member.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
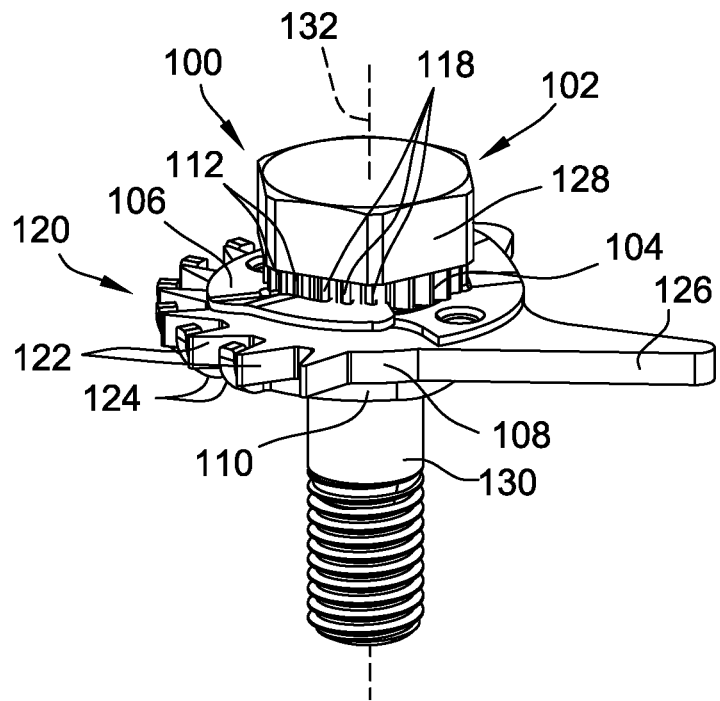
FIG. 1 is a perspective view of a fastener assembly.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms such as "about," "approximately," and "substantially" are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The fastening devices and systems described herein are typically used to fixedly connect two or more components in a variety of applications such as, and without limitation, surgical implants, industrial applications, aerospace applications, building applications, and military applications. Among other features and benefits, the disclosed fastening devices and systems can provide one or more of quick and easy installation and/or removal, and/or vibration resistant secured tightness.

Embodiments of the fastener assemblies described herein provide a fastener assembly that is simple to install and provides a secure attachment between two or more components. For example, in some embodiments, the fastener assemblies are used to secure elements such a header and a manifold. In some embodiments, a fastener assembly includes at least one arm that engages the element and prevents rotation of a lock member of the fastener assembly. The lock member allows selective tightening of the fastener assembly and prevents loosening of the fastener assembly when the lock member is in a locked configuration. The at least one arm is adjustable to accommodate different positions, orientations, shapes, and sizes of the element relative to the fastener assembly. For example, some embodiments include a pair of arms that define an angle therebetween and the angle is adjustable based on the position of the fastener assembly relative to a surface contacting the arms. The pair of arms may be separate pieces from each other or a single piece. The arms may be coupled to inner portions that selectively engage each other to fix the position of the arms relative to each other. In further embodiments, each arm includes a tab that extends at least partly in the axial direction and engages a surface of the manifold. In some embodiments, each arm is adjustable to adjust the position of the tab.

In an exemplary embodiment, a fastener assembly includes a threaded member including a threaded body portion and a head portion. The fastener assembly also includes a first lock member including at least one tooth and a second lock member including an inner portion and at least one tab extending from the inner portion. The at least one tab has a proximal end joined to the inner portion and a free end opposite the proximal end. The second lock member is positionable between a locked configuration in which the free end of the at least one tab is configured to engage the at least one tooth and an unlocked configuration in which the free end of the at least one tab is spaced from the at least one tooth.

The first lock member includes any tooth that enables the fastener assembly to function as described herein. For example, in some embodiments, the first lock member includes a plurality of radially extending ratchet teeth. In further embodiments, the first lock member includes at least one axially extending tooth.

In some embodiments, the first lock member or the second lock member is coupled in a rotationally fixed manner to the threaded member. In further embodiments, the first lock member or the second lock member is integrally formed with the threaded member as a single piece.

The fastener assembly also includes a first arm and a second arm extending from the second lock member and configured to engage a surface to inhibit rotation of the second lock member when the second lock member is in the locked configuration. The first arm and the second arm extend radially outward from the inner portion of the second lock member and define an angle therebetween. For example, in some embodiments, the angle is in a range of 1 degree to 180 degrees. In addition, the angle between the first arm and the second arm is adjustable by repositioning the arms relative to each other.

In some embodiments, the first and second arms are separate pieces that are coupled to each other and to the inner portion of the second lock member. The first and second arms are configured to engage each other to maintain the selected angle. For example, the first and second arms may include intermeshing teeth that are configured to engage at a plurality of different positions of the arms.

In another exemplary embodiment, a fastener assembly includes a threaded member, a first lock member including at least one tooth, a second lock member configured to engage the tooth in a locked configuration, and at least one arm extending from the second lock member and configured to engage a surface to inhibit rotation of the second lock member when the second lock member is in the locked configuration.

For example, the second lock member includes an inner portion defining an aperture extending therethrough. The aperture is sized to receive the threaded body portion. In addition, the second lock member includes at least one tab extending from the inner portion. The at least one tab has a proximal end joined to the inner portion and a free end opposite the proximal end. The second lock member is positionable between a locked configuration in which the free end of the at least one tab is configured to engage the at least one tooth and an unlocked configuration in which the free end of the at least one tab is spaced from the at least one tooth.

In some embodiments, the second lock member and the at least one arm are integrally formed as a single piece. In further embodiments, the at least one arm is included in a third lock member. The third lock member includes the at least one arm and an inner portion coupled to the second lock member. For example, the inner portion and the second lock member may be coupled by pins and/or engagement features formed on at least one of the inner portion of the second lock member and the inner portion of the third lock member. In some embodiments, the at least one arm comprises a plurality of arms extending radially outward from an outer edge of the inner portion.

In some embodiments, the at least one arm includes an axially extending tab configured to contact the surface. For example, the at least one arm may include a proximal end coupled to the inner portion and a distal end spaced from the inner portion. The tab may extend axially downward and be configured to contact a surface to prevent rotation of the at least one arm. The at least one arm may be repositionable to adjust the position of the axially extending tab relative to the surface. For example, the at least one arm may slide radially outward/inward to adjust the radial reach of the at least one arm. In some embodiments, the tab extends/retracts axially. In further embodiments, the at least one arm is configured to pivot about a hinge.

In some embodiments, a method of securing the fastener assembly generally includes aligning a first arm with a surface such that clockwise rotation is constrained. Next, the first arm is coupled to a second arm. For example, teeth on the second arm are positioned in intermeshing engagement with teeth on the first arm. Accordingly, the first arm acts as a spacer to position the second arm in a desired position. Coupling the first arm and the second arm maintains a desired orientation of the arms and forms an angle between the arms. A lock member is coupled to the first arm and the second arm such that the lock member is constrained against rotation by the arms. A threaded member is tightened relative to the lock member using a tool that positions the lock member to an unlocked configuration. When the tool is disengaged, the lock member is in the locked configuration and the fastener assembly is secured by the lock member and the arms to prevent rotation of the fastener assembly relative to the surface.

FIG. 1 is a perspective view of one embodiment of a fastener assembly designated generally by reference numeral 100. Fastener assembly 100 includes a threaded member 102, a first lock member 104, a second lock member 106, a third lock member 108, and a fourth lock member 110. In alternative embodiments, fastener assembly 100 includes any component that enables fastener assembly 100 to function as described herein.

In the exemplary embodiment, first lock member 104 is configured to couple to threaded member 102 for rotation therewith. For example, first lock member 104 and threaded member 102 are separate pieces and at least one of first lock member 104 and threaded member 102 includes engagement features such as corresponding flat sections that fix first lock member 104 for rotation with threaded member 102 when first lock member 104 is positioned on threaded member 102. In alternative embodiments, first lock member 104 is coupled to threaded member 102 in any manner that enables fastener assembly 100 to function as described herein. For example, in some embodiments, first lock member 104 and threaded member 102 are integrally formed or otherwise permanently joined together.

In the exemplary embodiment, first lock member 104 includes a plurality of ratchet teeth 112. Second lock member 106 includes at least one lock tooth 118 configured to engage ratchet teeth 112 of first lock member 104. Fastener assembly 100 has a locked configuration in which at least one lock tooth 118 of second lock member 106 engages ratchet teeth 112 of first lock member 104 and an unlocked configuration in which at least one lock tooth 118 is spaced from ratchet teeth 112.

Also, in the exemplary embodiment, second lock member 106 is coupled to third lock member 108 and fourth lock member 110 to form a lock assembly 120. Second lock member 106, third lock member 108, and fourth lock member 110 are coupled together in any manner that enables fastener assembly 100 to operate as described herein. In the exemplary embodiment, third lock member 108 and fourth lock member 110 include intermeshing teeth 122, 124. Second lock member 106 is coupled to third lock member 108 and fourth lock member 110 by one or more engagement features such as pins. In some embodiments, two or more of second lock member 106, third lock member 108, and/or fourth lock member 110 are integrally formed as a single piece.

In addition, in the exemplary embodiment, lock assembly 120 includes at least one lock arm 126 configured to engage a surface to inhibit rotation of fastener assembly 100 when fastener assembly 100 is in a locked configuration. In some embodiments, at least one lock arm 126 extends radially or axially outward from lock assembly 120 when lock assembly 120 is positioned on threaded member 102. Accordingly, fastener assembly 100 is able to be used with elements having blind holes such as a header assembly for a manifold. Fastener assembly 100 provides a locked configuration that prevents loosening of fastener assembly 100 without requiring a nut. Moreover, at least one lock arm 126 is able to engage surfaces on the joined elements. In addition, in some embodiments, the position of at least one lock arm 126 is adjustable to accommodate elements having different shapes, sizes, and configurations.

Moreover, in the exemplary embodiment, threaded member 102, first lock member 104, second lock member 106, third lock member 108, and fourth lock member 110 are fabricated from a metal, for example and without limitation, steel, aluminum, titanium, or a superalloy. Alternatively, threaded member 102, first lock member 104, second lock member 106, third lock member 108, and fourth lock member 110 are fabricated from any material that enables fastener assembly 100 to function as described herein, such as, without limitation, composite materials, resins, fiber reinforced resins, plastics, and fiber reinforced plastics.

Figure 2:
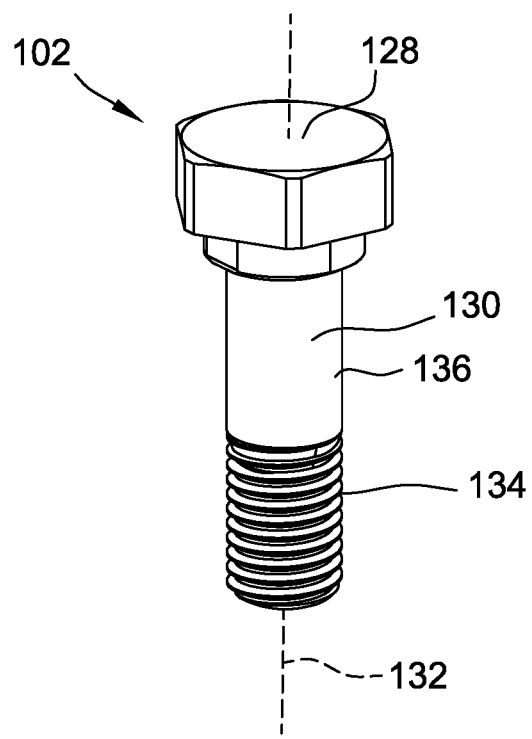
FIG. 2 is a perspective view of a threaded member of the fastener assembly of FIG. 1.

FIG. 2 is a perspective view of threaded member 102 of fastener assembly 100 (shown in FIG. 1). In the exemplary embodiment, threaded member 102 has a head 128 and a threaded body portion 130 extending along a longitudinal axis 132. In the exemplary embodiment, threaded body portion 130 and head 128 are integrally formed as a single piece. Head 128 is shaped and sized for threaded member 102 to be engaged and turned by a tool. For example, head 128 is hexagonal. Threaded body portion 130 includes threads 134 extending about and along longitudinal axis 132 in a helical arrangement. Accordingly, threaded body portion 130 is configured to engage a threaded bore (not shown in FIG. 2). In the exemplary embodiment, threads 134 extend along at least a portion of threaded body portion 130. In some embodiments, threads 134 extend along substantially the entirety of threaded body portion 130. In the exemplary embodiment, threaded body portion 130 includes an engagement feature 136 such as a flat surface. In alternative embodiments, fastener assembly 100 includes any threaded member 102 that enables fastener assembly 100 to function as described herein. For example, in some embodiments, head 128 of threaded member 102 is releasably coupled to threaded body portion 130. In further embodiments, head 128 is omitted.

Figure 3:
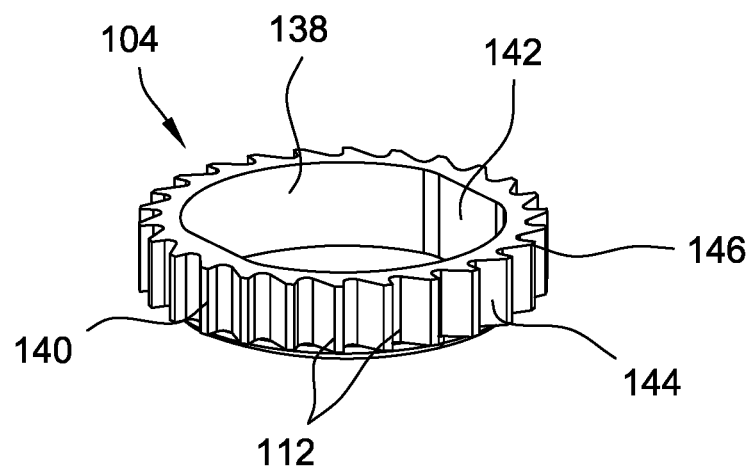
FIG. 3 is a perspective view of a first lock member of the fastener assembly of FIG. 1.

FIG. 3 is a perspective view of first lock member 104 of fastener assembly 100 (shown in FIG. 1). In the exemplary embodiment, first lock member 104 is a ring and includes an inner circumferential surface 138 and an outer circumferential surface 140 configured to extend about longitudinal axis 132 when first lock member 104 is coupled to threaded member 102 (shown in FIG. 2). First lock member 104 includes at least one engagement feature 142 arranged to engage threaded body portion 130 of threaded member 102 (shown in FIG. 2) to fix first lock member 104 for conjoint rotation with threaded member 102. For example, engagement feature 142 includes a flat portion on inner circumferential surface 138 that engages engagement feature 136 of threaded member 102.

Also, in the exemplary embodiment, ratchet teeth 112 extend radially outward from outer circumferential surface 140. Each ratchet tooth 112 is triangular having an angled surface (i.e., a hypotenuse) 144 across which at least one lock tooth 118 (shown in FIG. 1) can slide when threaded member 102 (shown in FIG. 1) is rotated in a tighten direction (clockwise in the exemplary embodiment) and a radially extending leg 146 which prevents movement of at least one lock tooth 118 in a loosen direction (counter-clockwise in the exemplary embodiment) when fastener assembly 100 is in the locked configuration. In alternative embodiments, first lock member 104 includes any ratchet teeth 112 that enable fastener assembly 100 to function as described herein. For example, in some embodiments, teeth 112 extend axially from an upper or lower surface of first lock member 104 to engage at least one axially extending lock tooth 118.

Figure 4:
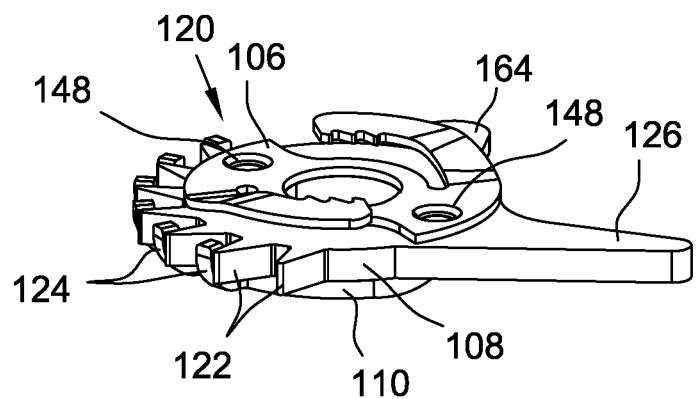
FIG. 4 is a perspective view of a lock assembly of the fastener assembly of FIG. 1, the lock assembly including a second lock member, a third lock member, and a fourth lock member.

FIG. 4 is a perspective view of lock assembly 120. Lock assembly 120 includes second lock member 106, third lock member 108, and fourth lock member 110. In the exemplary embodiment, second lock member 106, third lock member 108, and fourth lock member 110 are formed as separate pieces. Second lock member 106 is configured to couple to third lock member 108 and fourth lock member 110. For example, second lock member 106 and third lock member 108 include a plurality of engagement features, e.g., holes 148 that receive pins (not shown in FIG. 4), to retain second lock member 106, third lock member 108, and fourth lock member 110 together for conjoint rotation. In alternative embodiments, second lock member 106 is coupled to third lock member 108 and/or fourth lock member 110 in any manner that enables fastener assembly 100 to function as described herein. For example, in some embodiments, second lock member 106 is permanently attached to third lock member 108 and/or fourth lock member 110. In some embodiments, at least one of second lock member, third lock member 108, and fourth lock member 110 is omitted.

Figure 5:
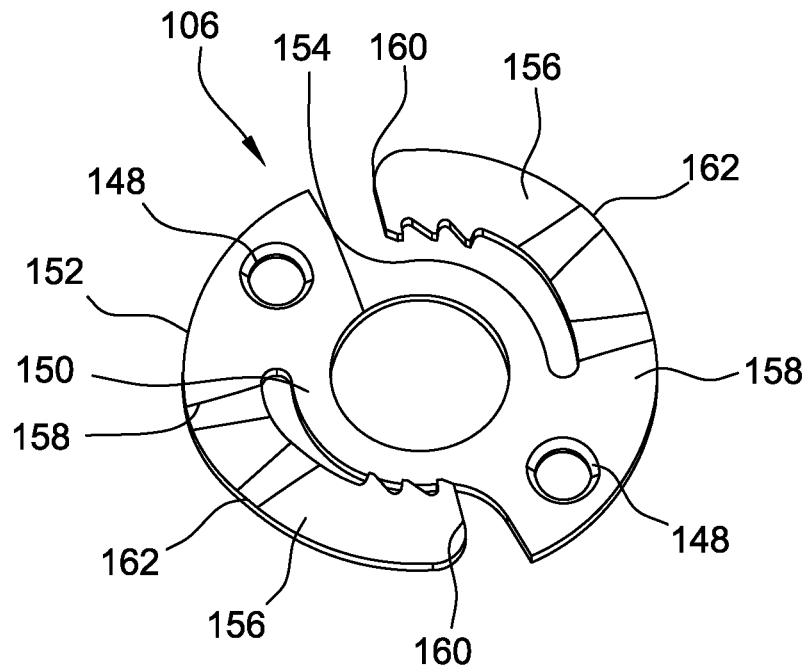
FIG. 5 is a perspective view of the second lock member of the lock assembly of FIG. 4.

FIG. 5 is a perspective view of second lock member 106. In the exemplary embodiment, second lock member 106 includes an inner portion 150 and an outer portion 152. Inner portion 150 defines an aperture 154 extending therethrough. Aperture 154 is sized to receive threaded member 102 (shown in FIG. 1). Outer portion 152 includes at least one tab 156 extending circumferentially about and axially from inner portion 150. In the exemplary embodiment, outer portion 152 includes a pair of diametrically opposite tabs 156. Each tab 156 has a proximal end 158 joined to inner portion 150 and a free end 160 opposite proximal end 158. Each free end 160 includes a plurality of lock teeth 118. In addition, each tab 156 includes bends 162 between proximal end 158 and free end 160. Bends 162 are configured such that lock teeth 118 on free ends 160 of tabs 156 extend radially inward toward ratchet teeth 112 of first lock member 104. For example, each bend 162 defines an angle of 45° or greater. In alternative embodiments, second lock member 106 includes any tab 156 that enables second lock member 106 to function as described herein. For example, in some embodiments, tabs 156 are configured such that lock teeth 118 extend radially outward to engage ratchet teeth 112 that extend radially inward. In further embodiments, lock teeth 118 extend axially from tabs 156.

Figure 6:
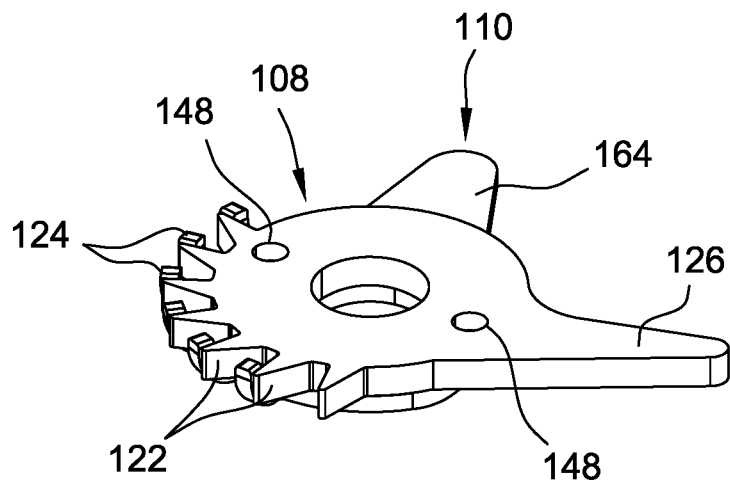
FIG. 6 is a perspective view of the third and fourth lock members of the lock assembly of FIG. 4, showing lock arms of the third and fourth lock members.
Figure 7:
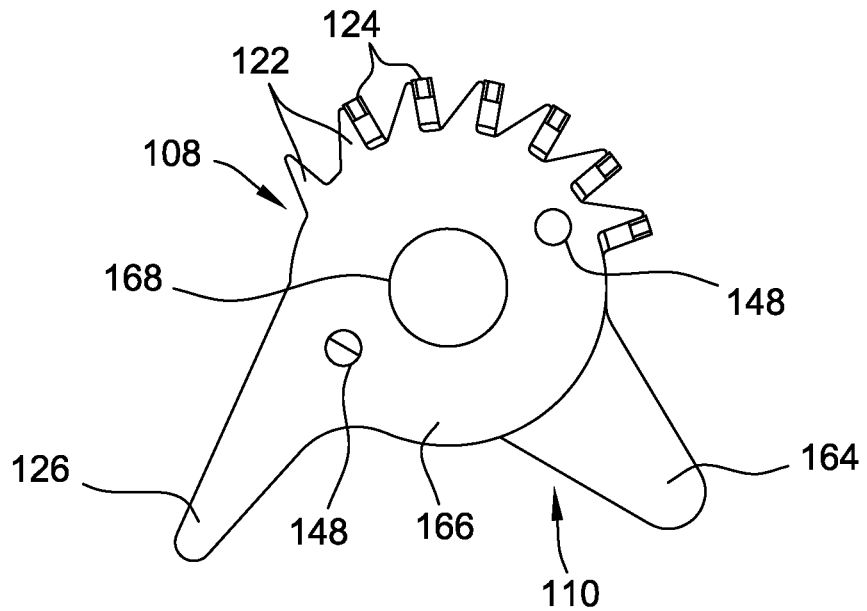
FIG. 7 is a top view of the third and fourth lock members.
Figure 8:
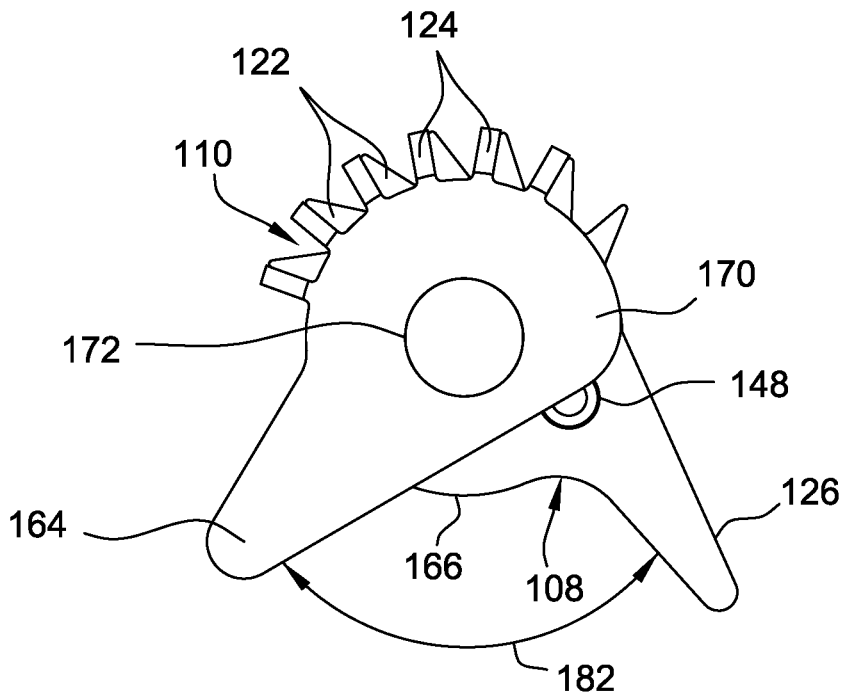
FIG. 8 is a bottom view of the third and fourth lock members.

FIG. 6 is a perspective view of third lock member 108 and fourth lock member 110, showing first lock arm 126 of third lock member 108 and a second lock arm 164 of fourth lock member 110. FIG. 7 is a top view of third lock member 108 and fourth lock member 110. FIG. 8 is a bottom view of third lock member 108 and fourth lock member 110. Third lock member 108 and fourth lock member 110 are releasably coupled together. For example, third lock member 108 includes first engagement teeth 122 and fourth lock member 110 includes second engagement teeth 124. First engagement teeth 122 are configured to engage second engagement teeth 124 to provide conjoint rotation of third lock member 108 and fourth lock member 110. In the exemplary embodiment, first engagement teeth 122 and second engagement teeth 124 enable third lock member 108 and fourth lock member 110 to be coupled together in a plurality of different positions to adjust the orientation and spacing of first lock arm 126 and second lock arm 164. In alternative embodiments, third lock member 108 and fourth lock member 110 are coupled together in any manner that enables fastener assembly 100 (shown in FIG. 1) to function as described herein. For example, in some embodiments, third lock member 108 and fourth lock member 110 are integrally formed as a single piece or otherwise permanently joined together.

Figure 9:
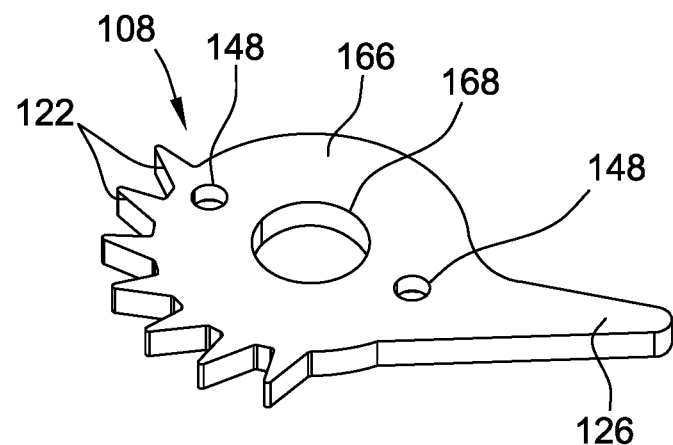
FIG. 9 is a perspective view of the third lock member.

FIG. 9 is a perspective view of third lock member 108. Third lock member 108 includes first lock arm 126 and an inner portion 166. Inner portion 166 is annular and defines an aperture 168 extending therethrough. Aperture 168 is sized to receive threaded member 102 (shown in FIG. 1). First lock arm 126 extends radially outward from inner portion 166. In alternative embodiments, fastener assembly 100 includes any third lock member 108 that enables fastener assembly 100 to function as described herein. In some embodiments, third lock member 108 is omitted.

Also, in the exemplary embodiment, first lock arm 126 is substantially triangular. For example, first lock arm 126 includes a proximal side coupled to inner portion 166 and two sides extending radially outward from inner portion 166. At least one of the radially extending sides defines an edge that is configured to engage a surface and inhibit rotation of third lock member 108. In alternative embodiments, first lock arm 126 is any shape that enables first lock arm 126 to function as described herein.

In addition, in the exemplary embodiment, first engagement teeth 122 extend radially outward from inner portion 166 on a side of inner portion 166 opposite first lock arm 126. In the exemplary embodiment, first engagement teeth 122, inner portion 166, and first lock arm 126 are substantially planar.

Figure 10:
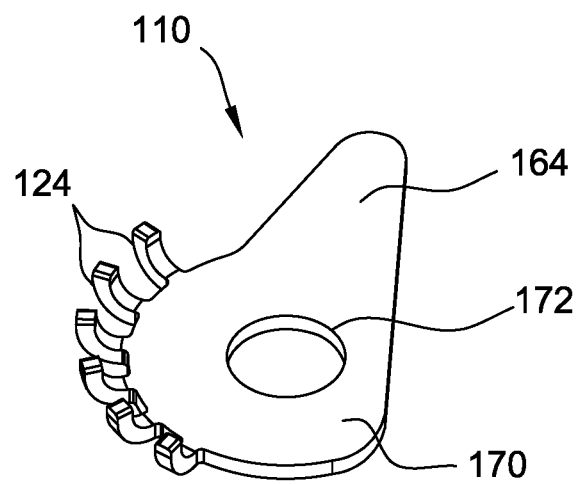
FIG. 10 is a perspective view of the fourth lock member.

FIG. 10 is a perspective view of fourth lock member 110. Fourth lock member 110 includes second lock arm 164 and an inner portion 170. Inner portion 170 is annular and defines an aperture 172 extending therethrough. Aperture 168 is sized to receive threaded member 102 (shown in FIG. 1). Second lock arm 164 extends radially outward from inner portion 170. In alternative embodiments, fastener assembly 100 includes any fourth lock member 110 that enables fastener assembly 100 to function as described herein. In some embodiments, fourth lock member 110 is omitted.

In the exemplary embodiment, second lock arm 164 is substantially triangular. For example, second lock arm 164 includes a proximal side coupled to inner portion 170 and two sides extending radially outward from inner portion 170. At least one of the radially extending sides defines an edge that is configured to engage a surface and inhibit rotation of fourth lock member 110. In alternative embodiments, second lock arm 164 is any shape that enables second lock arm 164 to function as described herein.

In addition, in the exemplary embodiment, second engagement teeth 124 extend at least partly radially outward from inner portion 170 on a side of inner portion 170 spaced from second lock arm 164. Inner portion 170 and second lock arm 164 are substantially planar. In the exemplary embodiment, second engagement teeth 124 are curved and extend at least partly axially. Accordingly, second engagement teeth 124 are non-planar with inner portion 170 and second lock arm 164. Second engagement teeth 124 are arranged to engage first engagement teeth 122 of third lock member 108 (shown in FIG. 6).

Figure 11:
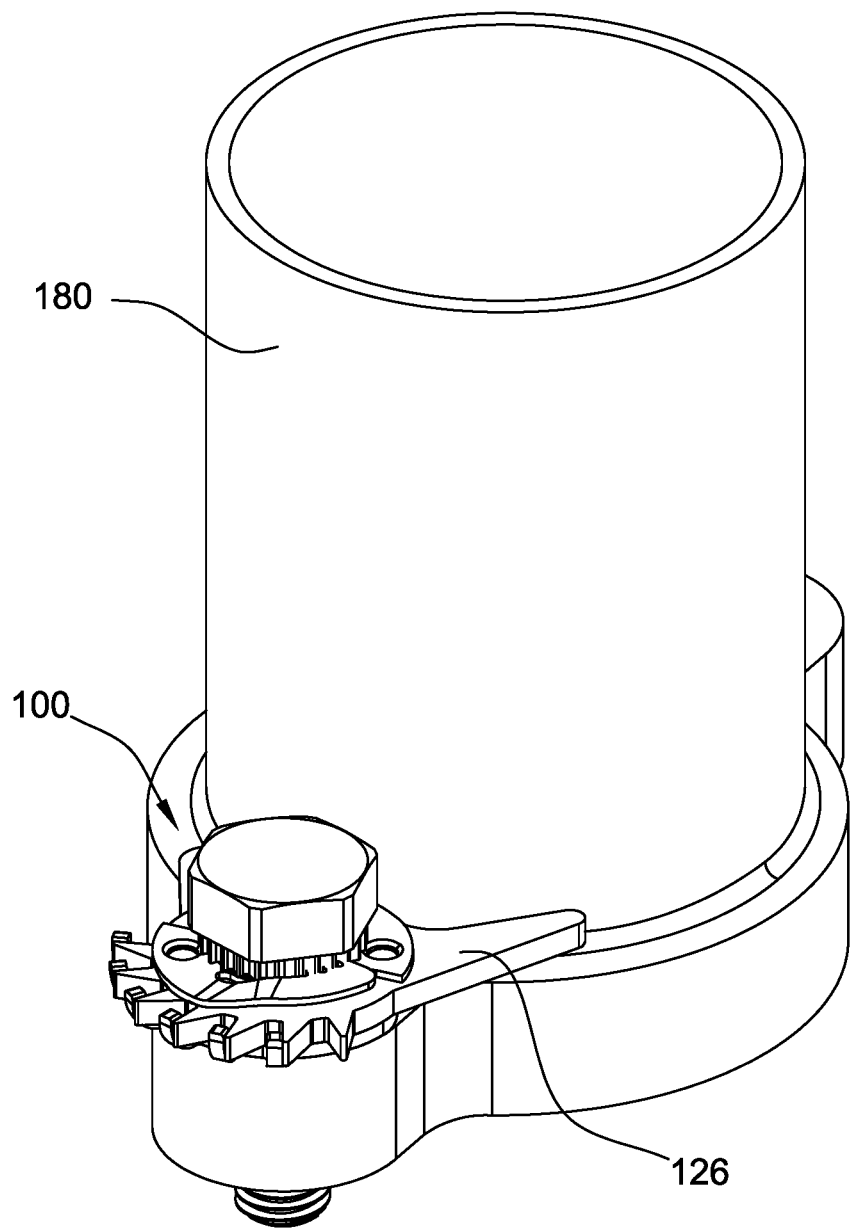
FIG. 11 is a perspective view of the fastener assembly of FIG. 1, secured to a header assembly.
Figure 12:
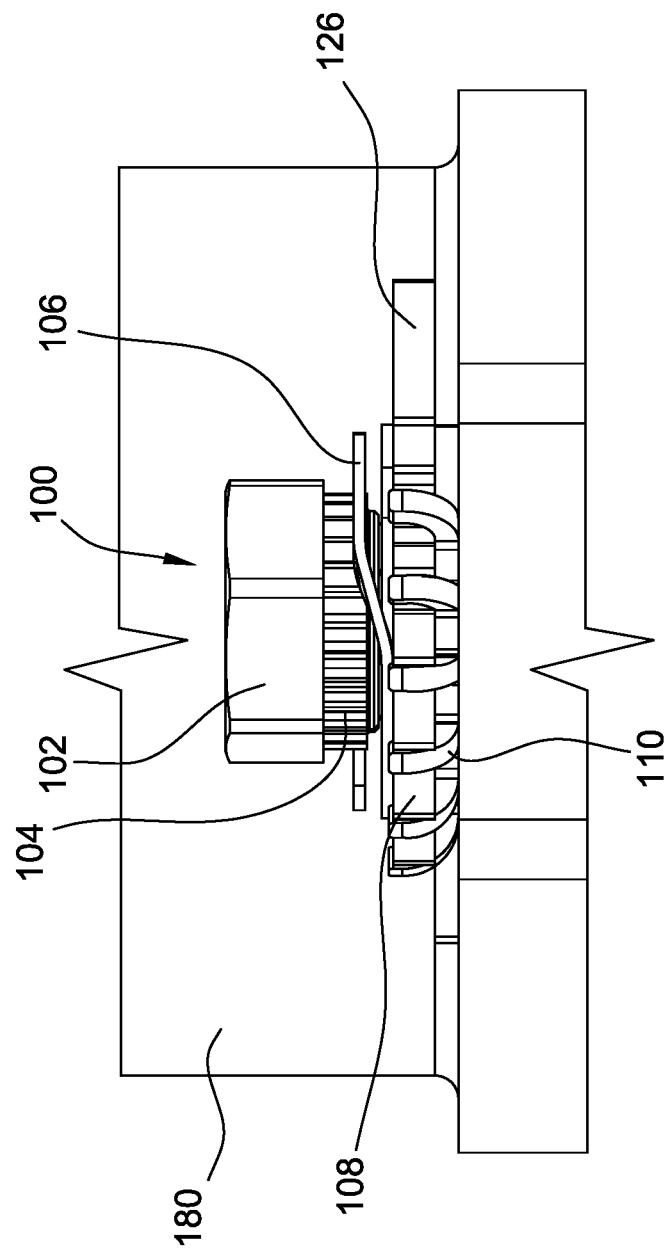
FIG. 12 is a side view of the fastener assembly of FIG. 1 and a portion of the header assembly of FIG. 11.
Figure 13:
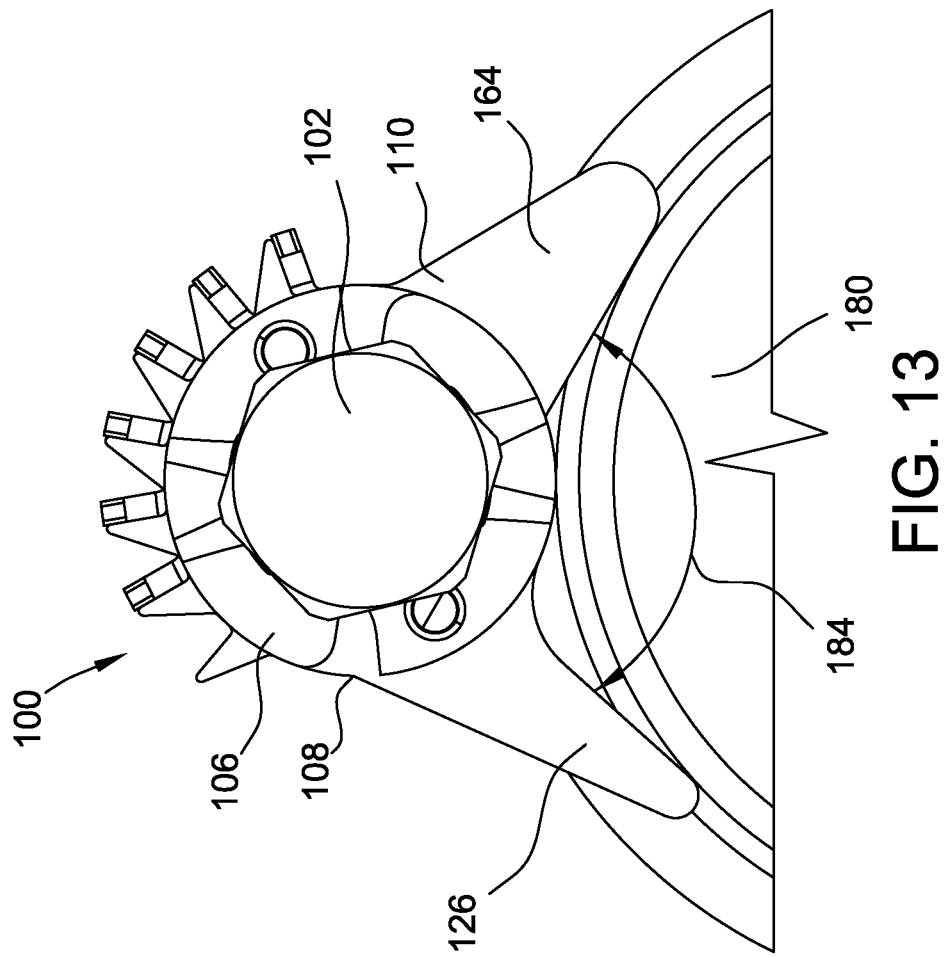
FIG. 13 is a top view of the fastener assembly of FIG. 1 and a portion of the header assembly of FIG. 11.

FIG. 11 is a perspective view of fastener assembly 100 secured to a header assembly 180. FIG. 12 is a side view of fastener assembly 100 and a portion of header assembly 180. FIG. 13 is a top view of fastener assembly 100 and a portion of header assembly 180. Fastener assembly 100 is configured to secure two or more elements such as header assembly 180 and a manifold assembly together. Fastener assembly 100 is configured to engage a surface of header assembly 180, or another element, to prevent loosening of fastener assembly 100 when fastener assembly 100 is in a locked configuration. For example, fastener assembly 100 includes lock arms 126, 164 that extend radially outward from fastener assembly 100 to contact a surface of header assembly 180.

In the exemplary embodiment, lock arms 126, 164 are arranged to engage opposite sides of header assembly 180 to prevent rotation of fastener assembly 100 in two directions. In addition, first lock arm 126 acts as a spacer to position second lock arm 164 relative to header assembly 180. Accordingly, lock arms 126, 164 prevent rotation of lock assembly 120 when threaded member 102 is tightened and prevent loosening of fastener assembly 100 when fastener assembly 100 is in the locked configuration. Lock arms 126, 164 each have a length that allows lock arms 126, 164 to contact a surface that is spaced from other components of fastener assembly 100. For example, in some embodiments, lock arms 126, 164 each have a length that is greater than a width of head 128 of threaded member 102 and greater than a radius of second lock member 106 and third lock member 108. As a result, lock arms 126 extend beyond the radial extents of other components of fastener assembly 100. Accordingly, lock arms 126, 164 are able to contact surfaces that are spaced apart from head 128 to allow clearance for a tool to engage fastener assembly 100.

In addition, in the exemplary embodiment, lock arms 126, 164 define an angle 184. For example, in some embodiments, angle 184 is in a range of about 1° to about 180°. In further embodiments, angle 184 is in a range of about 35° to about 90°. In some embodiments, the positions of lock arms 126, 164 are adjustable to change angle 184. In the exemplary embodiment, angle 184 is adjustable by changing the position of third lock member 108 relative to fourth lock member 110. For example, engagement teeth 122, 124 are arranged to engage each other and couple third lock member 108 and fourth lock member 110 together in a plurality of different positions. Accordingly, lock arms 126, 164 are able to accommodate elements having different sizes and shapes. In some embodiments, first lock arm 126 and/or second lock arm 164 are positionable relative to inner portions 166, 170. For example, in some embodiments, first lock arm 126 and/or second lock arm 164 includes a flexible portion that enables bending of first lock arm 126 or second lock arm 164. In further embodiments, first lock arm 126 and/or second lock arm 164 are positioned in any manner that enables fastener assembly 100 to function as described herein.

Figure 14:
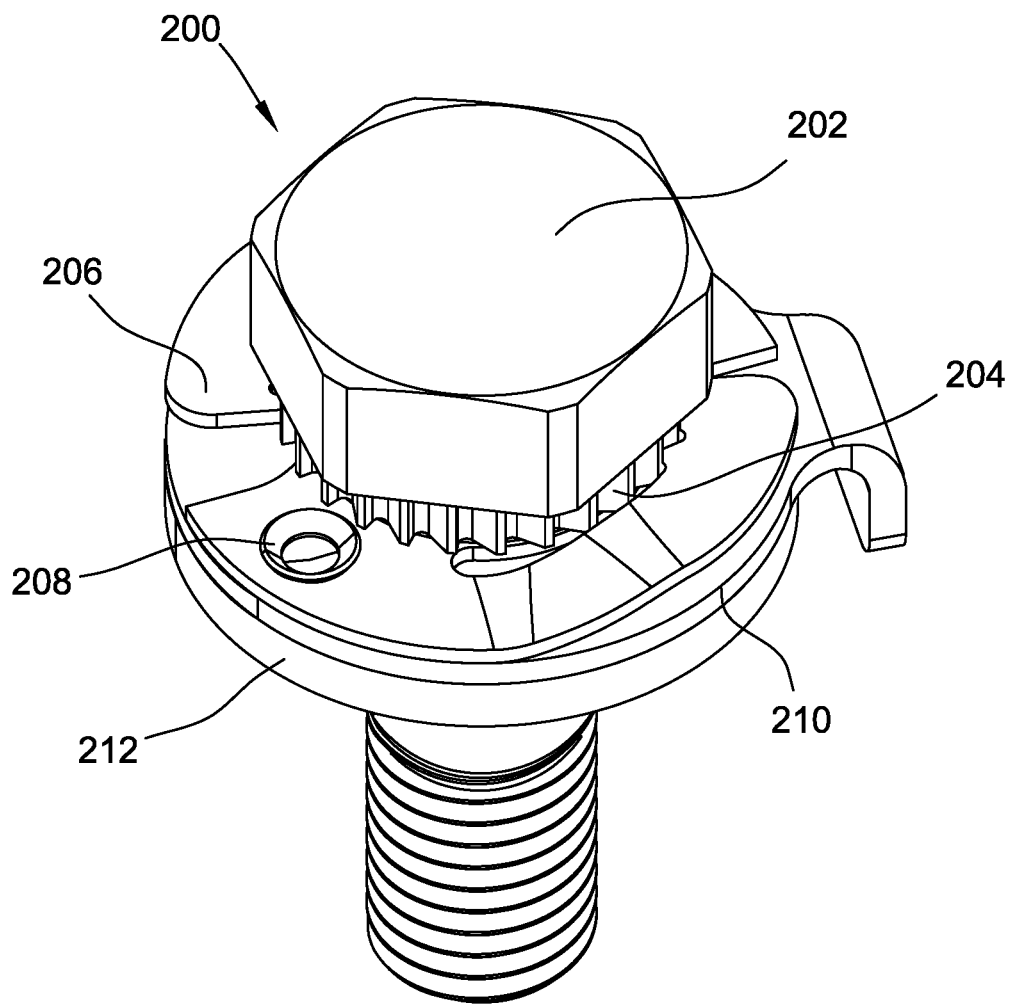
FIG. 14 is a perspective view of another embodiment of a fastener assembly.
Figure 15:
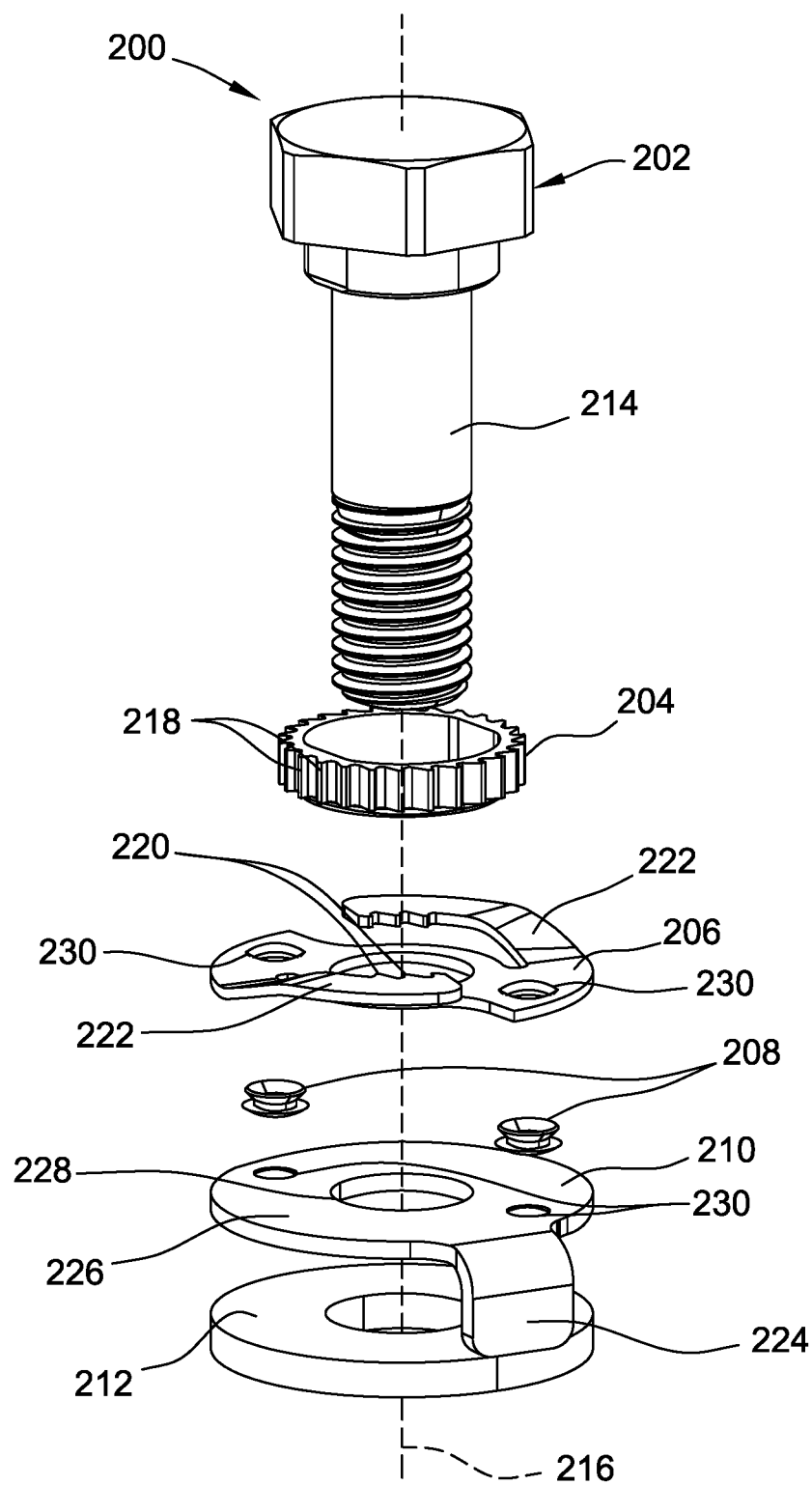
FIG. 15 is an exploded perspective view of the fastener assembly of FIG. 14, the fastener assembly including a threaded member, a first lock member, a second lock member, pins, a third lock member, and a washer.

FIG. 14 is a perspective view of another embodiment of a fastener assembly designated generally by reference numeral 200. FIG. 15 is an exploded perspective view of fastener assembly 200. Fastener assembly 200 includes a threaded member 202, a first lock member 204, a second lock member 206, pins 208, a third lock member 210, and a washer 212. Threaded member 202 has a threaded body portion 214 extending along a longitudinal axis 216. First lock member 204, second lock member 206, third lock member 210, and washer 212 each include an aperture sized to receive threaded body portion 214. First lock member 204 is configured to engage threaded member 202 for rotation therewith. In alternative embodiments, fastener assembly 200 includes any components that enable fastener assembly 200 to function as described herein. For example, in some embodiments, at least one of threaded member 202, first lock member 204, second lock member 206, pins 208, third lock member 210, and washer 212 is omitted.

In the exemplary embodiment, first lock member 204 includes a plurality of ratchet teeth 218 and second lock member 206 includes at least one lock tooth 220 on at least one tab 222. Fastener assembly 200 has a locked configuration in which at least one lock tooth 220 of second lock member 206 engages ratchet teeth 218 of first lock member 204 and an unlocked configuration in which at least one lock tooth 220 is spaced from ratchet teeth 218. Also, in the exemplary embodiment, second lock member 206 is coupled to third lock member 210. For example, pins 208 engage openings in second lock member 206 and third lock member 210 to releasably secure second lock member 206 and third lock member 210 together.

In addition, in the exemplary embodiment, third lock member 210 includes at least one lock arm 224 configured to engage a surface to prevent rotation of third lock member 210 and second lock member 206. In the exemplary embodiment, lock arm 224 includes an axially extending tab. Lock arm 224 prevents loosening of fastener assembly 200 when fastener assembly 200 is in a locked configuration. In some embodiments, lock arm 224 extends radially or axially outward from third lock member 210 when third lock member 210 is positioned on threaded member 202.

Figure 16:
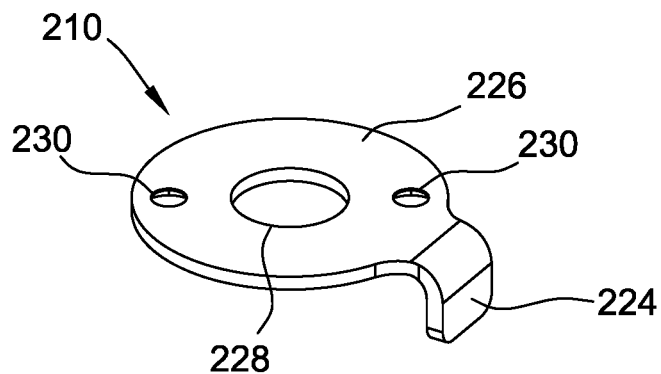
FIG. 16 is an upper perspective view of the third lock member of the fastener assembly of FIGS. 14 and 15, showing a lock arm of the third lock member.
Figure 17:
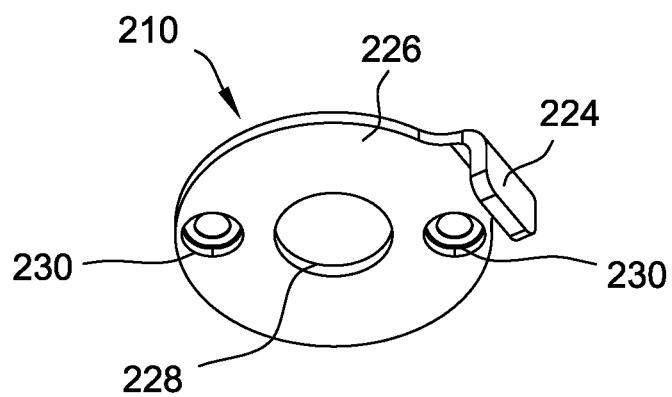
FIG. 17 is a lower perspective view of the third lock member.
Figure 18:
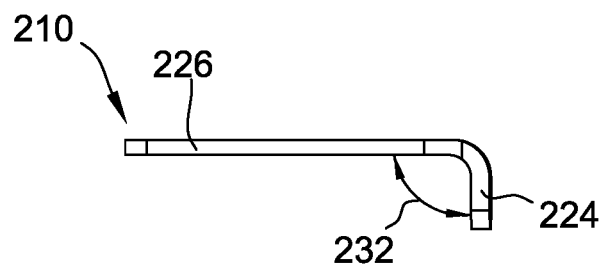
FIG. 18 is a side view of the third lock member.

FIG. 16 is an upper perspective view of third lock member 210. FIG. 17 is a lower perspective view of third lock member 210. FIG. 18 is a side view of third lock member 210. Third lock member 210 includes lock arm 224 and an inner portion 226. Inner portion 226 defines an aperture 228 sized to receive threaded member 102 therein and a plurality of openings 230 sized to receive pins 208 (shown in FIG. 15). Inner portion 226 is substantially planar. In alternative embodiments, third lock member 210 includes any inner portion 226 that enables third lock member 210 to function as described herein.

In addition, in the exemplary embodiment, lock arm 224 and inner portion 226 are permanently joined together. For example, lock arm 224 and inner portion 226 are integrally formed as a single piece. In addition, in the exemplary embodiment, the position of lock arm 224 is fixed relative to inner portion 226. In alternative embodiments, lock arm 224 is coupled to inner portion 226 in any manner that enables fastener assembly 200 to function as described herein. For example, in some embodiments, lock arm 224 is positionable relative to inner portion 226. In further embodiments, lock arm 224 is releasably coupled to inner portion 226.

Also, in the exemplary embodiment, lock arm 224 extends at least partly in an axial direction such that lock arm 224 and inner portion 226 form an angle 232. In some embodiments, angle 232 is in a range of about 45° to about 135°. In the exemplary embodiment, angle 232 is approximately 90°.

Figure 19:
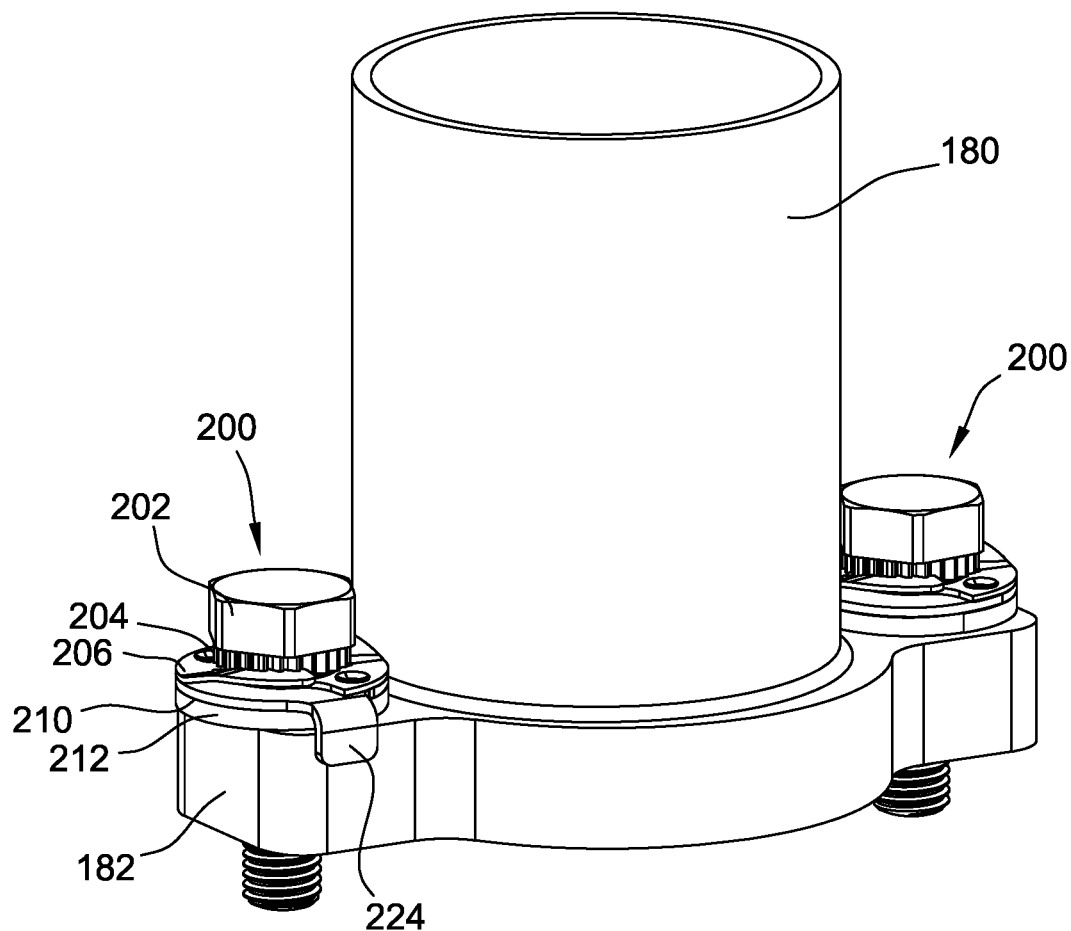
FIG. 19 is a perspective view of a pair of the fastener assemblies of FIG. 14 secured to a header assembly.

Moreover, in the exemplary embodiment, lock arm 224 is shaped to extend beyond the radial extents of other components of fastener assembly 200 and engage a surface (for example, a side of base 182 shown in FIG. 19). For example, lock arm 224 extends radially outward from inner portion 226 and beyond the radial extents of other components of fastener assembly 200. In addition, lock arm 224 curves generally downward at a bend 225 such that a free end of lock arm 224 is spaced axially from inner portion 226. Lock arm 224 is substantially planar between bend 225 and the free end of lock arm 224 and includes a radial facing surface that is configured to engage a surface of an element. In alternative embodiments, lock arm 224 is any shape that enables third lock member 210 to function as described herein.

Figure 20:
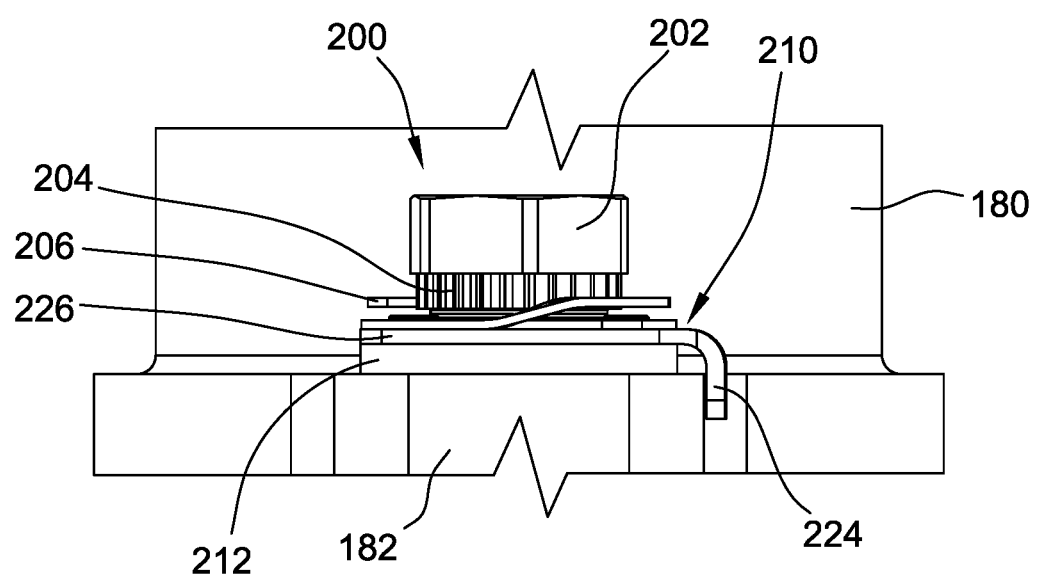
FIG. 20 is a side view of one of the fastener assemblies of FIG. 14 and a portion of the header assembly of FIG. 19.
Figure 21:
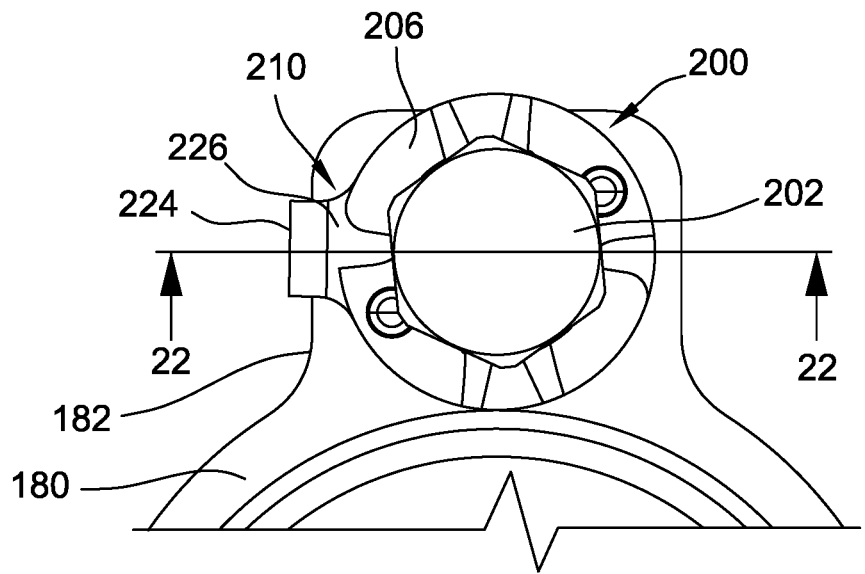
FIG. 21 is a top view of one of the fastener assemblies of FIG. 14 and a portion of the header assembly of FIG. 19.
Figure 22:
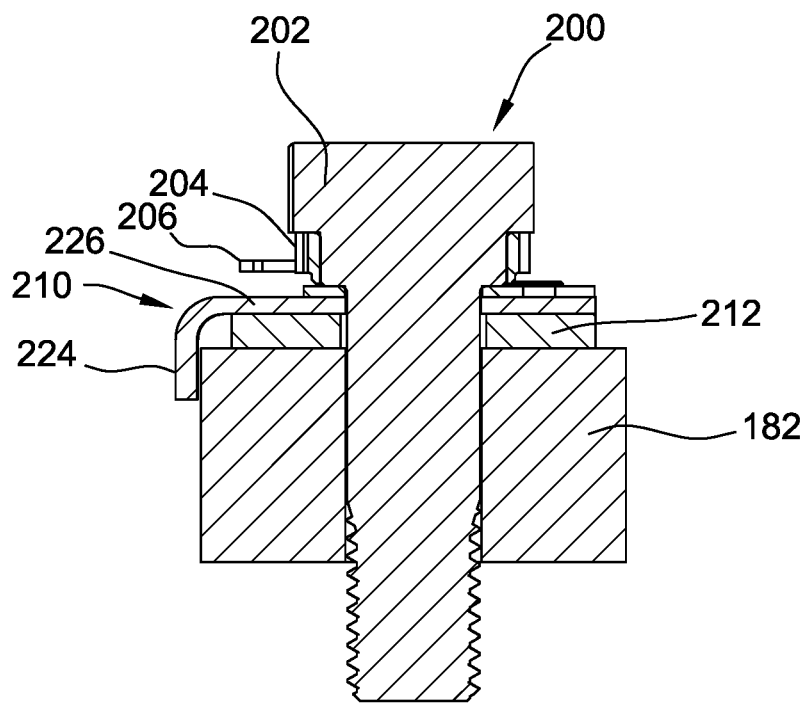
FIG. 22 is a sectional view of the fastener assembly of FIG. 14 secured to the header assembly, taken along line 22-22 in FIG. 21.

FIG. 19 is a perspective view of a pair of fastener assemblies 200 secured to header assembly 180. FIG. 20 is a side view of fastener assembly 200 and a portion of header assembly 180. FIG. 21 is a top view of fastener assembly 200 and a portion of header assembly 180. FIG. 22 is a sectional view of fastener assembly 200 secured to header assembly 180, taken along line 22-22 in FIG. 21. Fastener assembly 200 is configured to engage a surface of header assembly 180, or another component, to prevent loosening of fastener assembly 200 when fastener assembly 200 is in a locked configuration. For example, fastener assembly 200 includes a lock arm 224 that extends axially to contact a surface of header assembly 180.

In the exemplary embodiment, lock arm 224 is arranged to engage a base 182 of header assembly 180. For example, lock arm 224 has a length that enables lock arm 224 to contact and extend along a side of base 182. In the exemplary embodiment, the length of lock arm 224 in the axial direction is greater than a thickness of washer 212. Lock arm 224 includes a relatively flat tab that engages a planar surface of header assembly 180. Accordingly, lock arm 224 prevents rotation of third lock member 210 and second lock member 206 when second lock member 206 is coupled to third lock member 210. In some embodiments, the position of lock arm 224 is adjustable.

Figure 23:
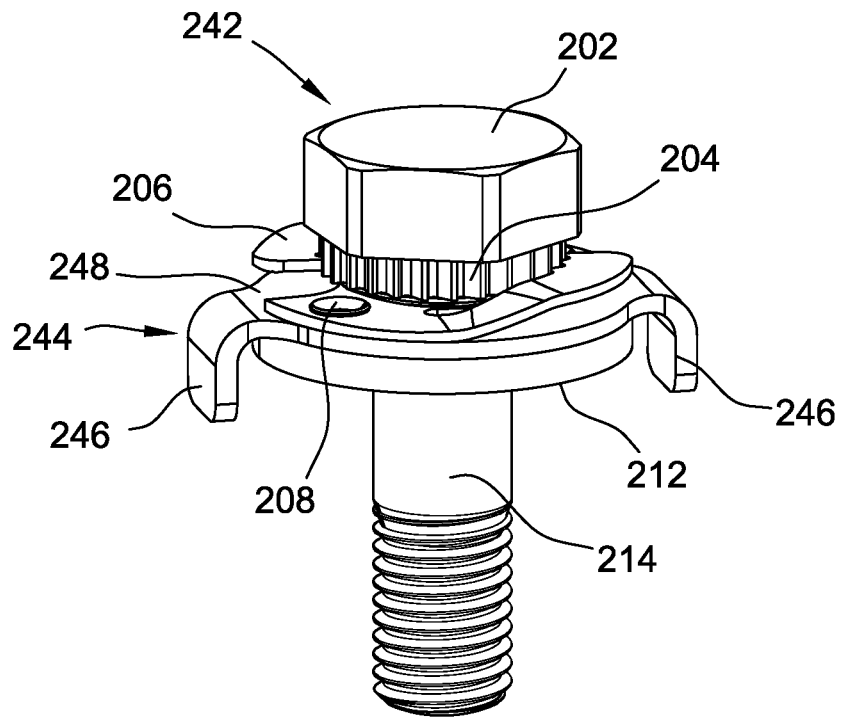
FIG. 23 is a perspective view of another embodiment of a fastener assembly, the fastener assembly including a third lock member having a pair of lock arms.

FIG. 23 is a perspective view of another embodiment of a fastener assembly designated generally by reference numeral 242. Fastener assembly 242 is similar to fastener assembly 200 (shown in FIG. 14) except fastener assembly 242 includes a third lock member 244 having a pair of lock arms 246. Third lock member 244 is configured to couple to second lock member 206 for rotation therewith. In alternative embodiments, fastener assembly 242 includes any components that enable fastener assembly 242 to function as described herein.

Figure 24:
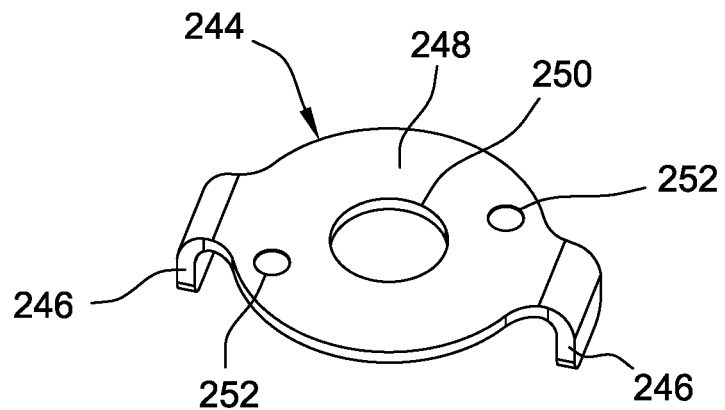
FIG. 24 is a perspective view of the third lock member of the fastener assembly of FIG. 23.
Figure 25:
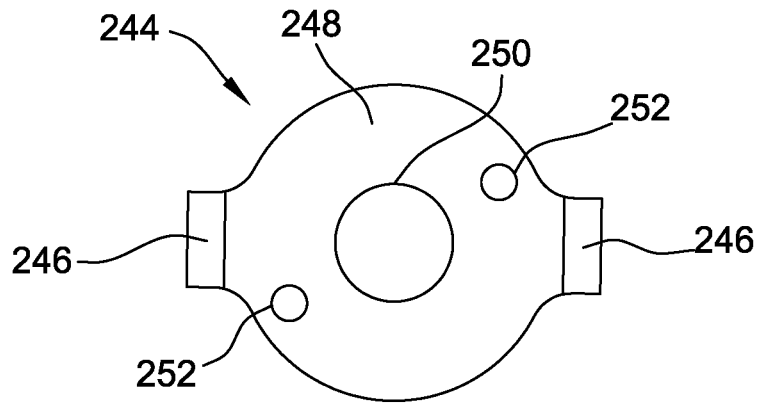
FIG. 25 is a top view of the third lock member.
Figure 26:
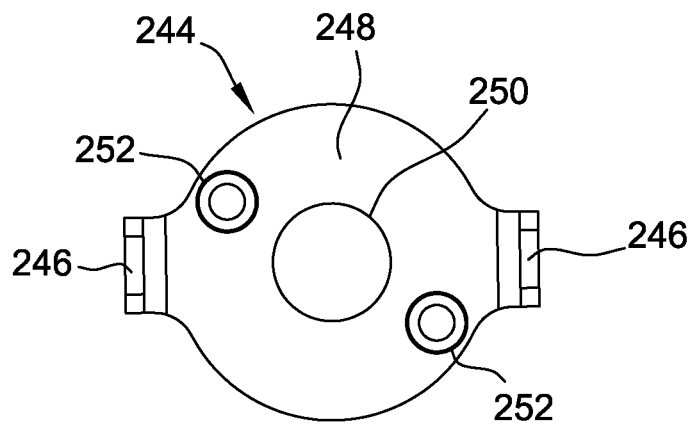
FIG. 26 is a bottom view of the third lock member.
Figure 27:
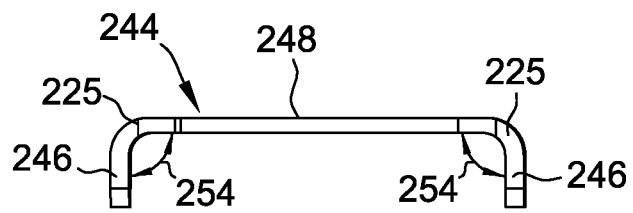
FIG. 27 is a side view of the third lock member.

FIG. 24 is a perspective view of third lock member 244. FIG. 25 is a top view of third lock member 244. FIG. 26 is a bottom view of third lock member 244. FIG. 27 is a side view of third lock member 244. Third lock member 244 includes lock arms 246 and an inner portion 248. Inner portion 248 defines an aperture 250 sized to receive threaded member 102 (shown in FIG. 23) and a plurality of openings 252 sized to receive pins 208 (shown in FIG. 23). Inner portion 248 is substantially planar. In alternative embodiments, third lock member 244 includes any inner portion 248 that enables third lock member 244 to function as described herein.

In addition, in the exemplary embodiment, lock arms 246 and inner portion 248 are permanently joined together. For example, lock arms 246 and inner portion 248 are integrally formed as a single piece. In addition, in the exemplary embodiment, the positions of lock arms 246 are fixed relative to inner portion 248. In alternative embodiments, lock arms 246 are coupled to inner portion 248 in any manner that enables fastener assembly 200 to function as described herein. For example, in some embodiments, at least one of lock arms 246 is positionable relative to inner portion 248. In further embodiments, lock arms 246 are releasably coupled to inner portion 248.

Also, in the exemplary embodiment, lock arms 246 extend from an outer edge of inner portion 248 at least partly in an axial direction. Lock arms 246 are positioned on opposite sides of inner portion 248. Inner portion 248 and each lock arm 246 define an angle 254. In some embodiments, angle 254 is in a range of about 45° to about 135°. In the exemplary embodiment, angle 254 is approximately 90°. In alternative embodiments, third lock member 244 includes any lock arm 246 that enables third lock member 244 to function as described herein. For example, in some embodiments, third lock member 244 includes three or more lock arms 246.

Figure 28:
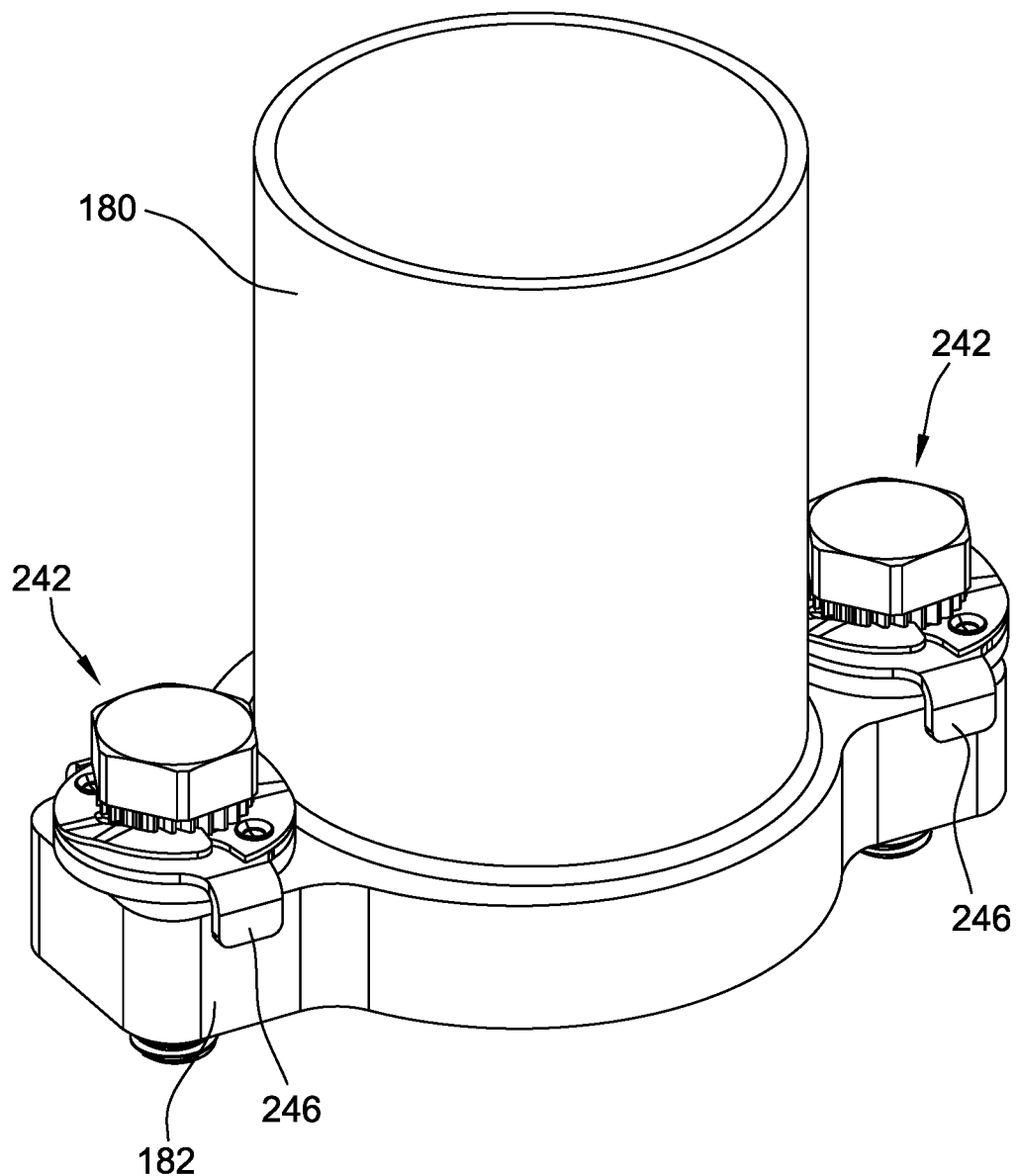
FIG. 28 is a perspective view of a pair of the fastener assemblies of FIG. 23 secured to a header assembly.
Figure 29:
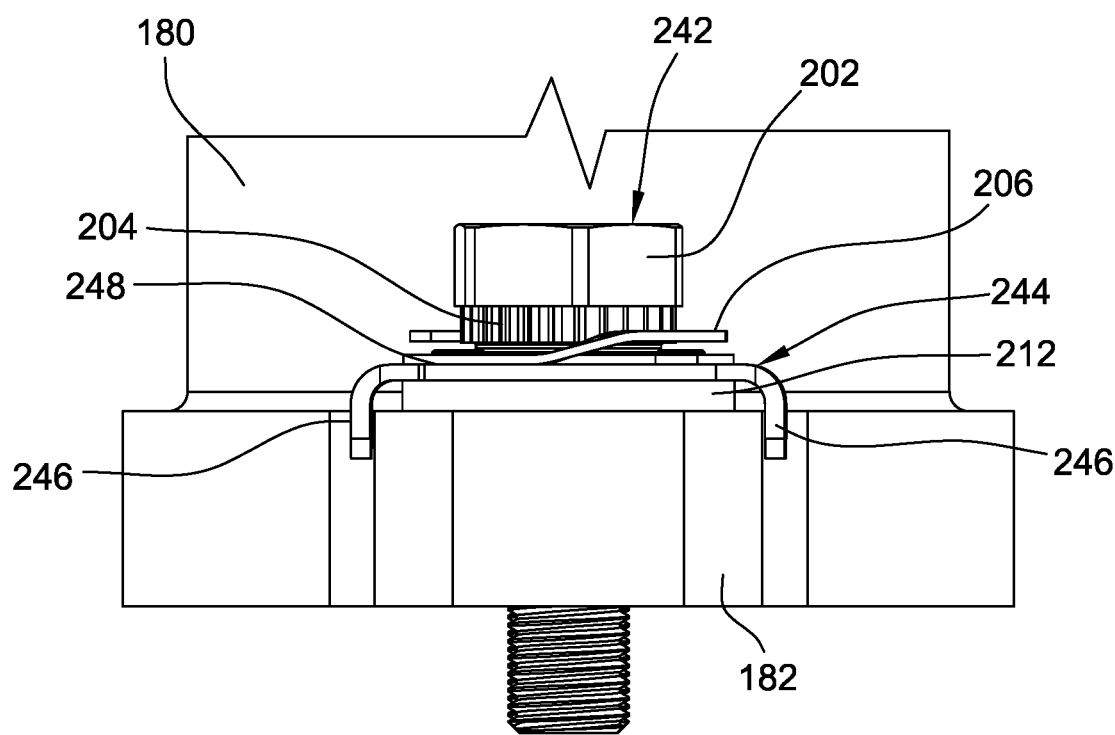
FIG. 29 is a side view of one of the pair of fastener assemblies of FIG. 23 and the header assembly of FIG. 28.

FIG. 28 is a perspective view of a pair of fastener assemblies 242 secured to header assembly 180. FIG. 29 is a side view of fastener assembly 242 and header assembly 180. In the exemplary embodiment, lock arms 246 are arranged to engage sides of header assembly 180 and prevent rotation of third lock member 244 in two directions. Accordingly, lock arms 246 prevent rotation of third lock member 244 when threaded member 202 is tightened and prevent loosening of fastener assembly 242 when fastener assembly 242 is in the locked configuration.

Figure 30:
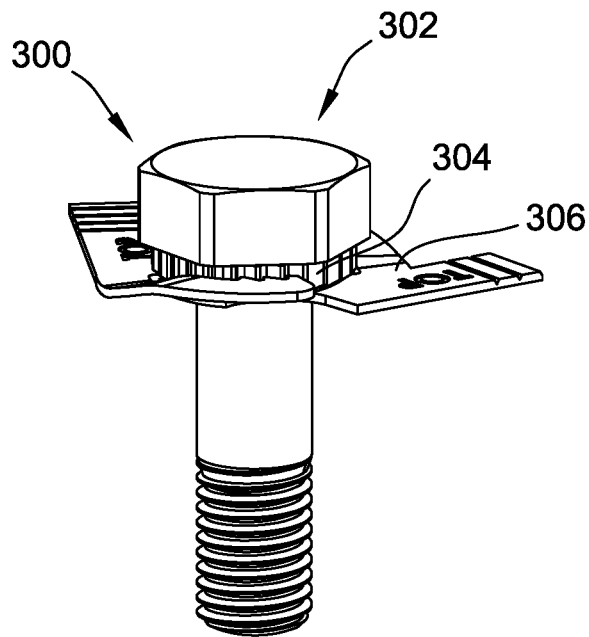
FIG. 30 is a perspective view of another embodiment of a fastener assembly, the fastener assembly including a threaded member, a first lock member, and a second lock member.

FIG. 30 is a perspective view of another embodiment of a fastener assembly, designated generally by reference numeral 300. Fastener assembly 300 includes a threaded member 302, a first lock member 304, and a second lock member 306. In alternative embodiments, fastener assembly 300 includes any components that enable fastener assembly 300 to function as described herein.

Figure 31:
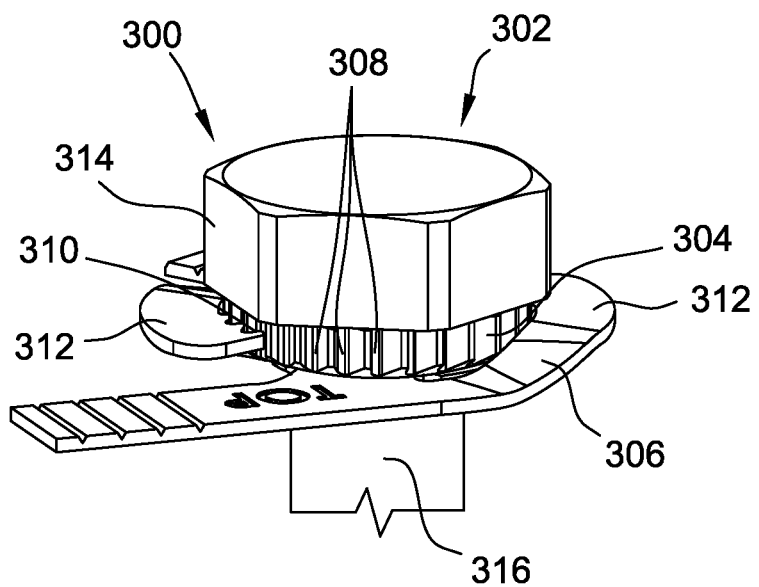
FIG. 31 is an enlarged perspective view of a portion of the fastener assembly of FIG. 30, showing ratchet teeth of the first lock member engaged with at least one lock tooth of the second lock member.

FIG. 31 is an enlarged perspective view of a portion of fastener assembly 300, showing ratchet teeth 308 of first lock member 304 engaged with at least one lock tooth 310 of second lock member 306. Fastener assembly 300 has a locked configuration in which at least one lock tooth 310 of second lock member 306 engages ratchet teeth 308 of first lock member 304 and an unlocked configuration in which at least one lock tooth 310 is spaced from ratchet teeth 308. For example, second lock member 306 includes a pair of diametrically opposite tabs 312 having lock teeth 310. Tabs 312 are deflectable to switch fastener assembly 300 between the locked configuration and the unlocked configuration. In some embodiments, a tool (not shown) is used to switch fastener assembly 300 between the locked configuration and the unlocked configuration.

Figure 32:
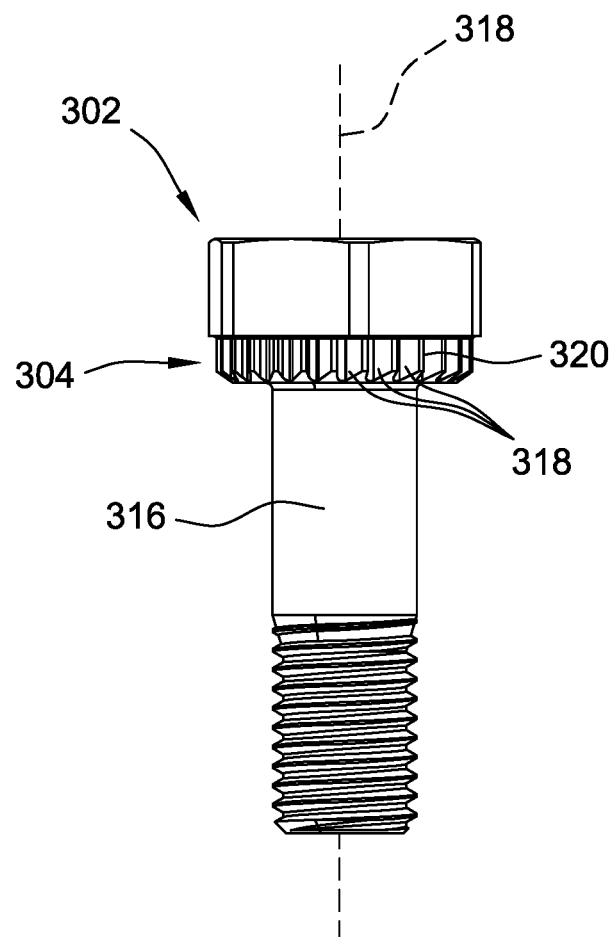
FIG. 32 is a side view of the threaded member and the first lock member of the fastener assembly of FIG. 30.

FIG. 32 is a side view of threaded member 302 and first lock member 304 of fastener assembly 300. Threaded member 302 includes a head 314 and a threaded body portion 316 extending along a longitudinal axis 318. Also, in the exemplary embodiment, threaded member 302 and first lock member 304 are integrally formed as a single piece. Accordingly, fastener assembly 300 may be simpler to assemble than fastener assemblies including multiple pieces.

In the exemplary embodiment, first lock member 304 includes an outer circumferential surface 320 extending about longitudinal axis 318. Ratchet teeth 308 extend radially outward from outer circumferential surface 320. In alternative embodiments, fastener assembly 300 includes any first lock member 304 that enables fastener assembly 300 to function as described herein. For example, in some embodiments, ratchet teeth 308 extend axially from a surface of first lock member 304 to engage at least one axially extending lock tooth 310.

Figure 33:
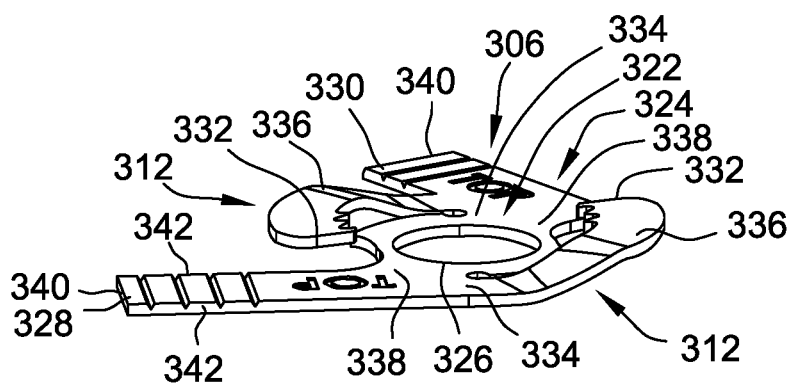
FIG. 33 is a perspective view of the second lock member of the fastener assembly of FIG. 30, the second lock member including at least one lock arm.
Figure 34:
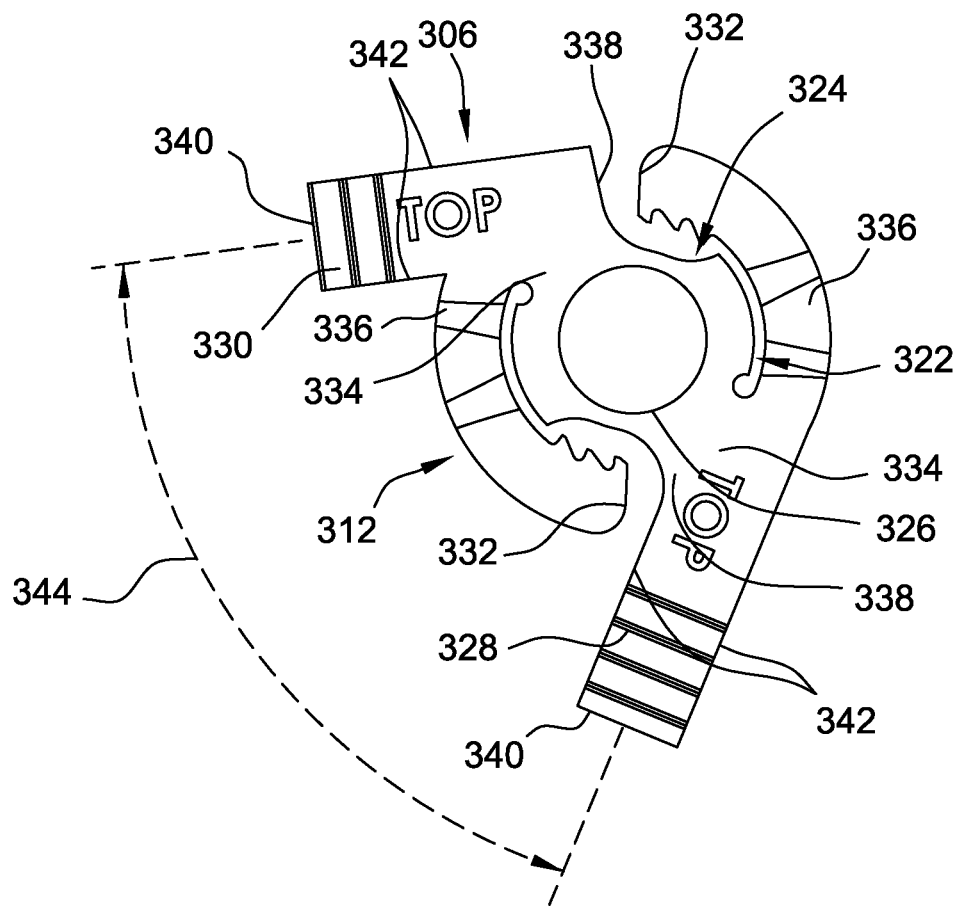
FIG. 34 is a top view of the second lock member.
Figure 35:
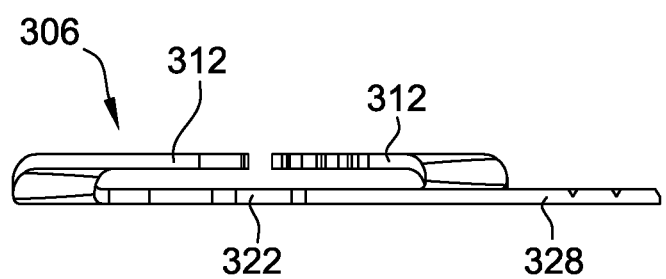
FIG. 35 is a side view of the second lock member.

FIG. 33 is a perspective view of second lock member 306. FIG. 34 is a top view of second lock member 306. FIG. 35 is a side view of second lock member 306. Second lock member 306 includes an inner portion 322 and an outer portion 324. Inner portion 322 defines an aperture 326 extending therethrough. Aperture 326 is sized to receive threaded member 302 (shown in FIG. 32). In alternative embodiments, fastener assembly 300 includes any second lock member 306 that enables fastener assembly 300 to function as described herein.

Also, in the exemplary embodiment, outer portion 324 includes at least one tab 312 and at least one lock arm 328, 330. In the exemplary embodiment, outer portion 324 includes a pair of diametrically opposite tabs 312 extending circumferentially about and axially from inner portion 322. Each tab 312 has a free end 332 and a proximal end 334 joined to inner portion 322. Each free end 332 includes a plurality of lock teeth 310. In addition, each tab 312 includes bends 336 between proximal end 334 and free end 332. Bends 336 are configured such that lock teeth 310 on free ends 332 of tabs 312 extend radially inward toward ratchet teeth 308 of first lock member 304 (shown in FIG. 31).

In addition, in the exemplary embodiment, outer portion 324 includes a first lock arm 328 and a second lock arm 330. Each lock arm 328, 330 extends radially outward from inner portion 322. First lock arm 328 extends from a location on inner portion 322 adjacent to proximal end 334 of one of tabs 312. Second lock arm 330 extends from a location on inner portion 322 adjacent to proximal end 334 of another one of tabs 312. First lock arm 328 and second lock arm 330 extend at oblique angles to each other and along axes that do not intersect longitudinal axis 318. In alternative embodiments, second lock member 306 includes any lock arm, 328, 330 that enables second lock member 306 to function as described herein. For example, in some embodiments, second lock member 306 includes a single lock arm 328, 330. In further embodiments, second lock member 306 includes three or more lock arms 328, 330.

Moreover, in the exemplary embodiment, inner portion 322, first lock arm 328, and second lock arm 330 are substantially planar. In the exemplary embodiment, tabs 312 extend at least partly axially from inner portion 322. Accordingly, tabs 312 are non-planar with inner portion 322, first lock arm 328, and second lock arm 330 when second lock member 306 is in a lock configuration. Tabs 312 are deflectable into a space defined about inner portion 322. In alternative embodiments, second lock member 306 has any configuration that enables second lock member 206 to function as described herein. For example, in some embodiments, first lock arm 328 and/or second lock arm 330 extend at least in part axially from inner portion 322.

Also, in the exemplary embodiment, first lock arm 328 and second lock arm 330 are rectangular. For example, first lock arm 328 and second lock arm 330 each have a proximal end 338, a free end 340, and a pair of parallel sides 342 extending between proximal end 338 and free end 340. At least one side 342 of each lock arm 328, 330 is configured to engage a surface and inhibit rotation of second lock member 306. In addition, first lock arm 328 and second lock arm 330 each have a length and a width. In the illustrated embodiment, first lock arm 328 is longer than second lock arm 330. The widths of first lock arm 328 and second lock arm 330 are substantially equal.

Also, in some embodiments, first lock arm 328 and second lock arm 330 define a plurality of notches extending between sides 342. The notches may facilitate adjusting the length of first lock arm 328 and second lock arm 330. For example, notches may allow one or more sections of first lock arm 328 or second lock arm 330 to be removed to adjust the length of the lock arm. Accordingly, second lock member 306 may accommodate elements having different shapes and sizes and second lock member 306 may be used in a variety of applications.

In addition, in the exemplary embodiment, first lock arm 328 and second lock arm 330 define an angle 344. For example, in some embodiments, angle 344 is in a range of about 1° to about 180°. In further embodiments, angle 344 is in a range of about 35° to about 90°. In alternative embodiments, second lock member 306 includes any lock arm 328, 330 that enables second lock member 306 to function as described herein. For example, in some embodiments, the position of first lock arm 328 and/or second lock arm 330 is adjustable.

Figure 36:
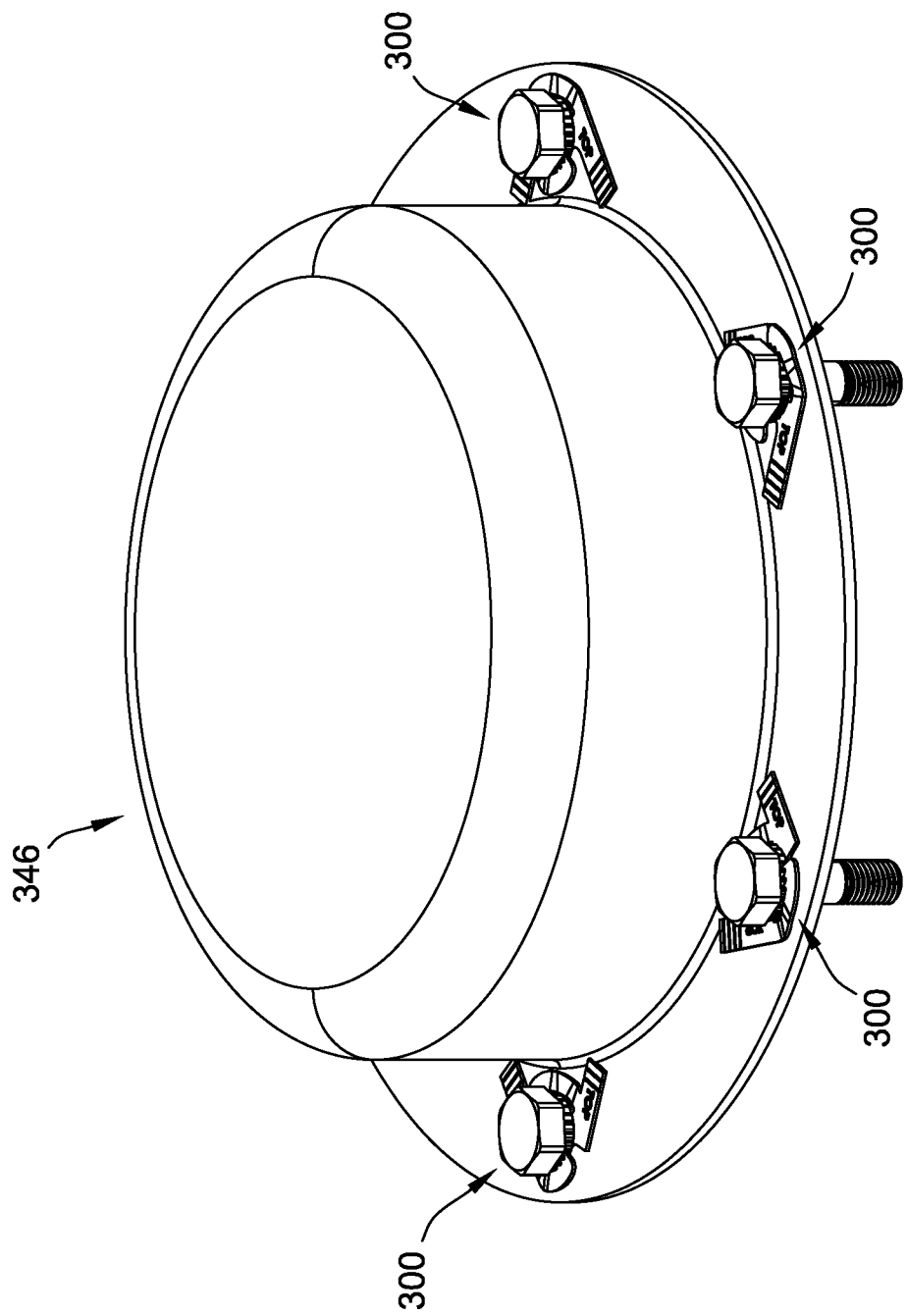
FIG. 36 is a perspective view of a plurality of the fastener assemblies of FIG. 30 secured to a header assembly.
Figure 37:
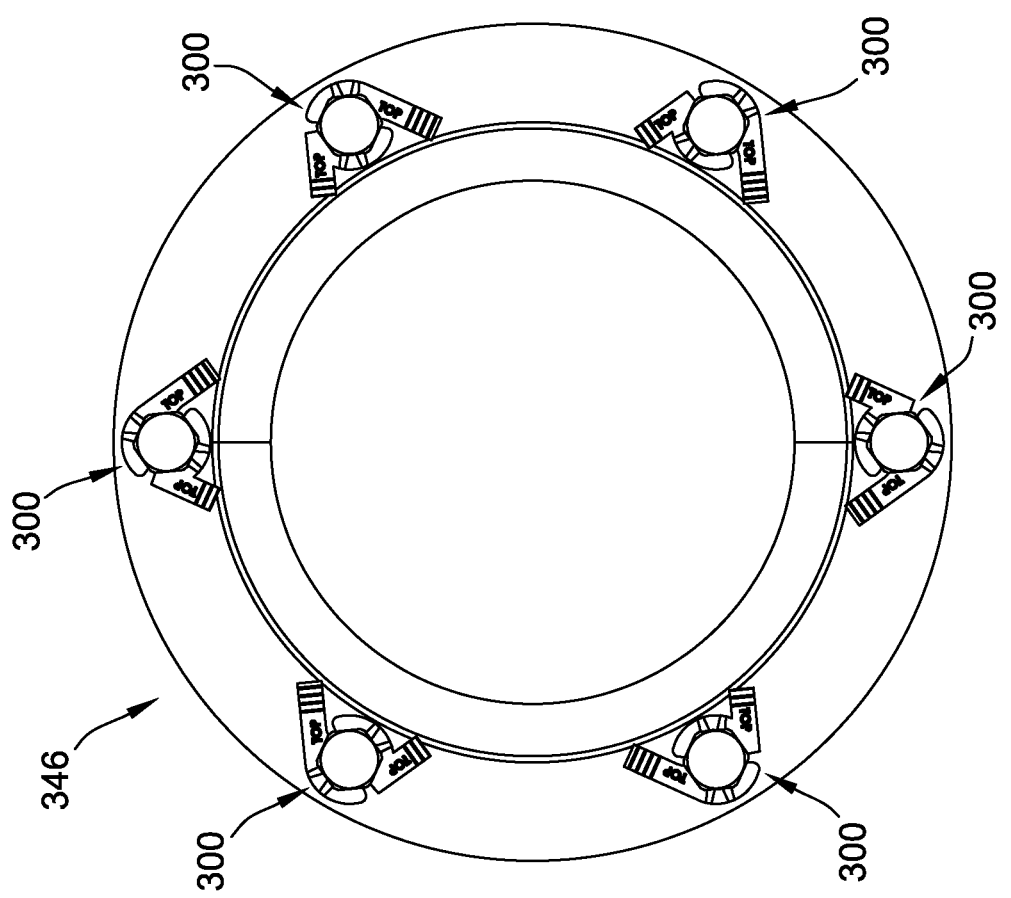
FIG. 37 is a top view of a plurality of the fastener assemblies of FIG. 36 and the header assembly of FIG. 36.
Figure 38:
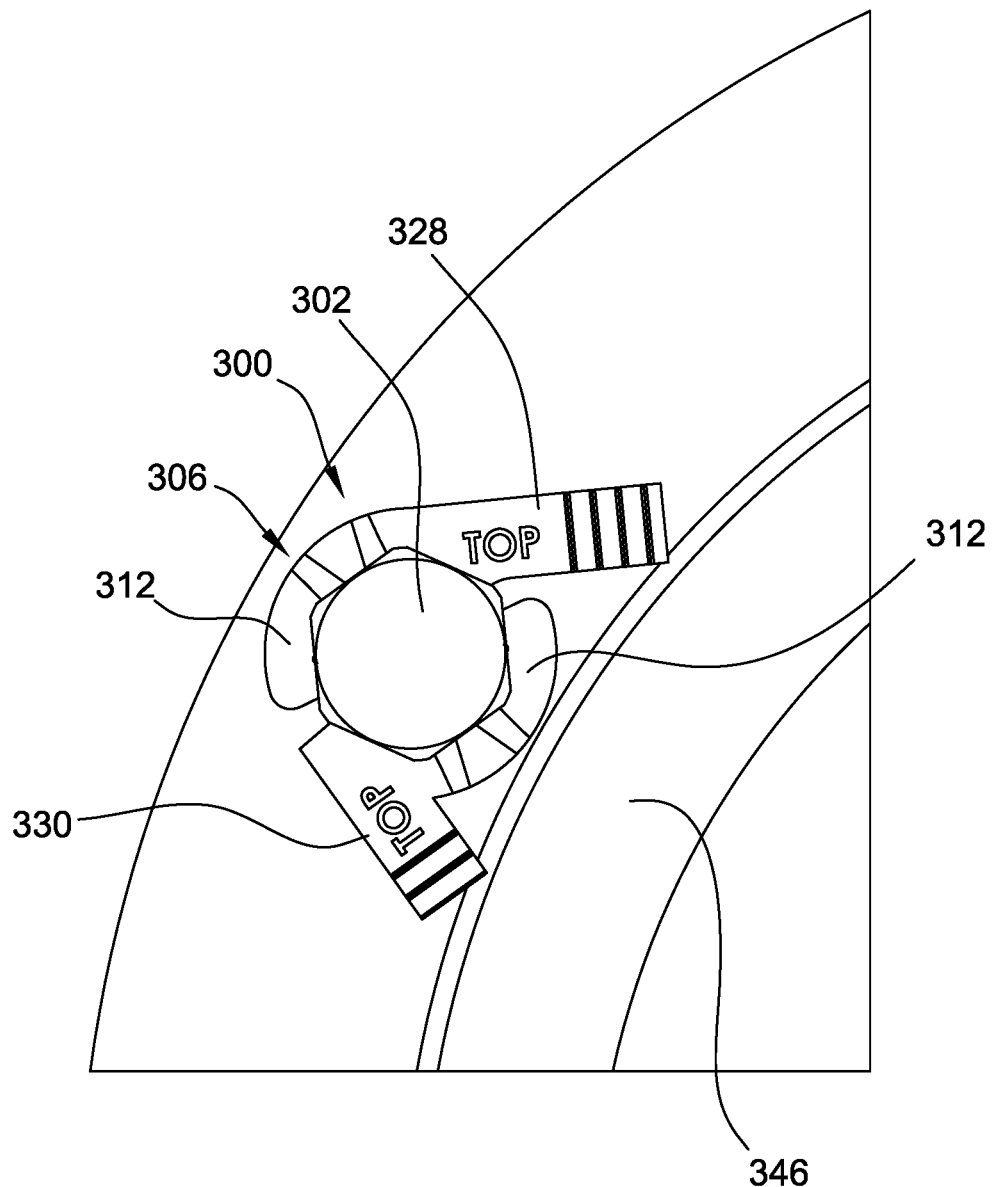
FIG. 38 is an enlarged top view of one of the plurality of fastener assemblies of FIG. 36 and a portion of the header assembly of FIG. 36.

FIG. 36 is a perspective view of a plurality of fastener assemblies 300 secured to a header assembly 346. FIG. 37 is a top view of fastener assemblies 300 and header assembly 346. FIG. 38 is an enlarged top view of one of the plurality of fastener assemblies and a portion of the header assembly 346. Fastener assembly 300 is configured to secure two or more elements, such as header assembly 346 and a manifold assembly, together. Fastener assembly 300 is configured to engage a surface of header assembly 346, or another element, to prevent loosening of fastener assembly 300 when fastener assembly 300 is in a locked configuration. For example, fastener assembly 300 includes lock arms 328, 330 that extend radially outward from fastener assembly 300 to contact a surface of header assembly 346.

In the exemplary embodiment, lock arms 328, 330 are arranged to engage a circumferential wall of header assembly 346 to prevent rotation of fastener assembly 300. In some embodiments, first lock arm 328 or second lock arm 330 acts as a spacer to position the other lock arm 328, 330 relative to header assembly 346. For example, first lock arm 328 and second lock arm extend on opposite sides of fastener assembly 300 and contact the surface of header assembly 346 at circumferentially spaced apart locations. Lock arms 328, 330 prevent rotation of fastener assembly 300 when threaded member 302 is tightened and prevent loosening of fastener assembly 300 when fastener assembly 300 is in the locked configuration.

The fastener components as described herein provide locking and vibration resistant fastener assemblies. For example, as described in the embodiments herein, when a tool is removed from the associated fastener assembly, teeth on the lock member and/or fastener engage the notches or teeth of the respective lock washer. When the teeth are engaged, the fastener and/or member is rotationally locked due to the rotational locking relationship of the lock washer to the teeth. When the tool is applied to the fastener assembly, the lock member is displaced to disengage the teeth from the notches. When the teeth are disengaged from the notches, the fastener and/or member is rotationally free relative to the lock washer and the fitting body. The fastener assembly may include one or more lock arms that engage a surface to prevent rotation of the fastener assembly relative to the surface when the fastener assembly is in the locked configuration.

Exemplary embodiments of systems and methods for rotationally locked fastener assemblies are described above. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fastener assembly comprising:
   a threaded member comprising a threaded body portion having a longitudinal axis;
   a first lock member coupled to said threaded member, said first lock member including a plurality of ratchet teeth;
   a second lock member including at least one lock tooth configured to engage said plurality of ratchet teeth of said first lock member, wherein said fastener assembly has a locked configuration in which said at least one lock tooth engages said plurality of ratchet teeth and an unlocked configuration in which said at least one lock tooth is spaced from said plurality of ratchet teeth;
   a first lock arm coupled to said second lock member; and
   a second lock arm coupled to said second lock member, said first lock arm and said second lock arm configured to engage a surface to inhibit rotation of said second lock member, wherein said first lock arm and said second lock arm extend radially outward from said second lock member and define an angle therebetween, wherein the angle between said first lock arm and said second lock arm is adjustable.

2. The fastener assembly in accordance with claim 1, wherein said first lock arm is substantially planar and extends in a radial direction, said first lock arm including a radially extending edge configured to engage the surface.

3. The fastener assembly in accordance with claim 1, wherein said first lock arm includes a bend and extends at least in part in an axial direction.

4. The fastener assembly in accordance with claim 1, wherein an orientation of said first lock arm relative to said second lock member is adjustable.

5. The fastener assembly in accordance with claim 1 further comprising a third lock member including said first lock arm and an inner portion, wherein said third lock member is coupled to said second lock member.

6. The fastener assembly in accordance with claim 5 further comprising pins configured to couple said third lock member to said second lock member.

7. The fastener assembly in accordance with claim 5, wherein said first lock arm and said second lock arm extend from opposite sides of said inner portion.

8. The fastener assembly in accordance with claim 5, wherein said inner portion and said first lock arm are substantially planar, said first lock arm extending radially outward from said inner portion.

9. The fastener assembly in accordance with claim 5, wherein said inner portion is substantially planar, and wherein said first lock arm extends at an angle relative to said inner portion.

10. The fastener assembly in accordance with claim 5, further comprising a fourth lock member including said second lock arm.

11. A lock assembly for a threaded member, said lock assembly comprising:
   a first lock member including an inner portion and a plurality of ratchet teeth extending from said inner portion, said inner portion defining an aperture to receive the threaded member;
   a second lock member including at least one lock tooth configured to engage said plurality of ratchet teeth of said first lock member, wherein said lock assembly has a locked configuration in which said at least one lock tooth engages said plurality of ratchet teeth and an unlocked configuration in which said at least one lock tooth is spaced from said plurality of ratchet teeth;
   a third lock member coupled to said second lock member, said third lock member including an inner portion and at least one lock arm extending at least in part radially outward of said second lock member, said at least one lock arm configured to engage a surface to inhibit rotation of said second lock member; and
   pins configured to couple said third lock member to said second lock member.

12. The lock assembly in accordance with claim 11, wherein said at least one lock arm is substantially planar and extends in a radial direction, said at least one lock arm including a radially extending edge configured to engage the surface.

13. The lock assembly in accordance with claim 11, wherein said at least one lock arm includes a bend and extends at least in part in an axial direction.

14. The lock assembly in accordance with claim 11, wherein an orientation of said at least one lock arm relative to said second lock member is adjustable.

15. The lock assembly in accordance with claim 11 further comprising a fourth lock member, said fourth lock member coupled to said second lock member, wherein said at least one lock arm comprises a first lock arm and a second lock arm, said third lock member includes said first lock arm and said fourth lock member includes said second lock arm, wherein said third lock member and said fourth lock member are coupled together such that said first lock arm and said second lock arm form an angle.

16. The lock assembly in accordance with claim 11, wherein said at least one lock arm comprises a first lock arm and a second lock arm, wherein said first lock arm and said second lock arm extend radially outward from said second lock member and define an angle therebetween.

17. The lock assembly in accordance with claim 16, wherein the angle between said first lock arm and said second lock arm is adjustable.

18. A method of assembling a lock assembly for a fastener assembly, the fastener assembly including a threaded member, said method comprising:
   forming a first lock member including an inner portion and a plurality of ratchet teeth extending from the inner portion, the inner portion defining an aperture to receive the threaded member;
   forming a second lock member including an inner portion and at least one tab extending from the inner portion;
   forming at least one lock tooth on the at least one tab, the at least one lock tooth configured to engage the plurality of ratchet teeth of the first lock member, wherein the lock assembly has a locked configuration in which the at least one lock tooth engages the plurality of ratchet teeth and an unlocked configuration in which the at least one lock tooth is spaced from the plurality of ratchet teeth;
   forming a first lock arm configured to couple to the second lock member; and
   forming a second lock arm configured to couple to the second lock member, the first lock arm and the second lock arm configured to engage a surface to inhibit rotation of the second lock member, wherein the first lock arm and the second lock arm extend radially outward from the second lock member and define an angle therebetween, wherein the angle between the first lock arm and the second lock arm is adjustable.

19. The method in accordance with claim 18 further comprising forming a third lock member, the third lock member including an inner portion and the first lock arm, the first lock arm extending at an angle from the inner portion.

20. The method in accordance with claim 19 further comprising forming pins configured to couple the third lock member to the second lock member.

* * * * *